US005889890A

United States Patent [19]
Heimburger

[11] Patent Number: 5,889,890
[45] Date of Patent: Mar. 30, 1999

[54] PROCESS FOR CORRECTION AND ESTIMATION OF MOVEMENT IN FRAMES HAVING PERIODIC STRUCTURES

[75] Inventor: Catherine Heimburger, Illkirch, France

[73] Assignee: Thomson multimedia S.A., France

[21] Appl. No.: 768,112

[22] Filed: Dec. 16, 1996

[30] Foreign Application Priority Data

Dec. 22, 1995 [FR] France .................................. 95 15402

[51] Int. Cl.$^6$ .......................................... G06K 9/00
[52] U.S. Cl. ................................ 382/236; 382/238
[58] Field of Search ................................ 382/236, 248, 382/107, 181, 190, 191, 192, 193, 194, 195, 196, 199, 201, 203, 204, 209, 217, 232, 233, 235, 238, 239, 241, 242, 243, 244, 251, 252, 253, 274, 275, 278, 286, 293, 300, 308, 309; 348/699, 416, 413, 459, 429, 452, 448, 409, 407, 417, 420

[56] References Cited

U.S. PATENT DOCUMENTS

| | | |
|---|---|---|
| 4,890,160 | 12/1989 | Thomas .................................. 348/429 |
| 5,103,305 | 4/1992 | Watanabe ................................ 382/236 |
| 5,351,095 | 9/1994 | Kerdranvat ............................... 348/413 |
| 5,469,226 | 11/1995 | David et al. ............................. 348/699 |
| 5,535,288 | 7/1996 | Chen et al. .............................. 348/416 |
| 5,537,155 | 7/1996 | O'Connell et al. ...................... 348/416 |
| 5,610,662 | 3/1997 | Hackett .................................. 348/452 |

FOREIGN PATENT DOCUMENTS

| | | |
|---|---|---|
| 94 115 734 | 1/1995 | European Pat. Off. . |
| 0 647 919 | 4/1995 | European Pat. Off. .......... G06T 7/20 |
| 2 277 003 | 10/1994 | United Kingdom ............. H04N 5/14 |

*Primary Examiner*—Leo H. Boudreau
*Assistant Examiner*—Bijan Tadayon
*Attorney, Agent, or Firm*—Joseph S. Tripoli; Frederick A. Wein; Alexander J. Burke

[57] ABSTRACT

A system relates to a process for correcting the estimation of movement in frames including periodic structures in a system for determining movement vectors by comparison of blocks of frames, an error matrix being associated with each block. The process is characterized in that it includes the stages of determining adjacent periodic blocks and of selecting a single movement vector for all of these blocks. The process applies, in particular, in the sphere of television.

10 Claims, 15 Drawing Sheets

FIELD 1    FIELD 2    FIELD 2/3

FIELD 1    FIELD 2/3  FIELD 3

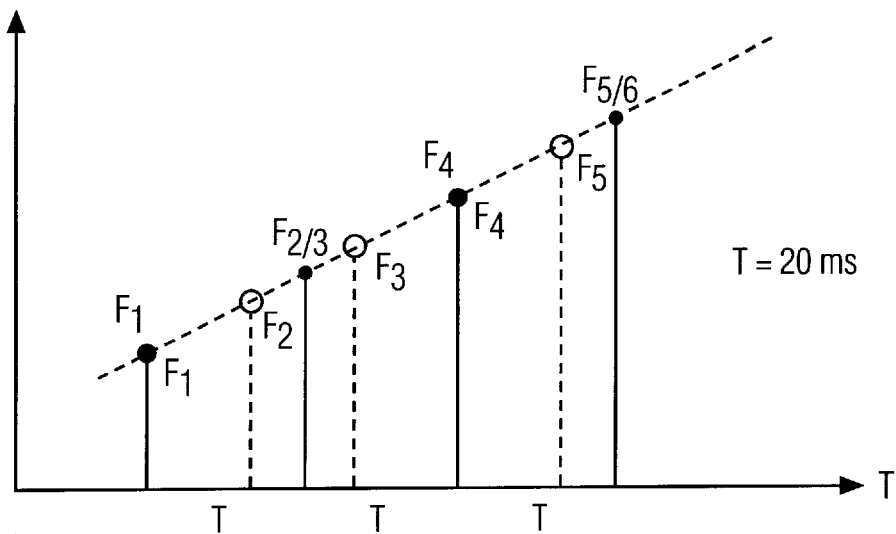
FIG. 16a    T = 20 ms
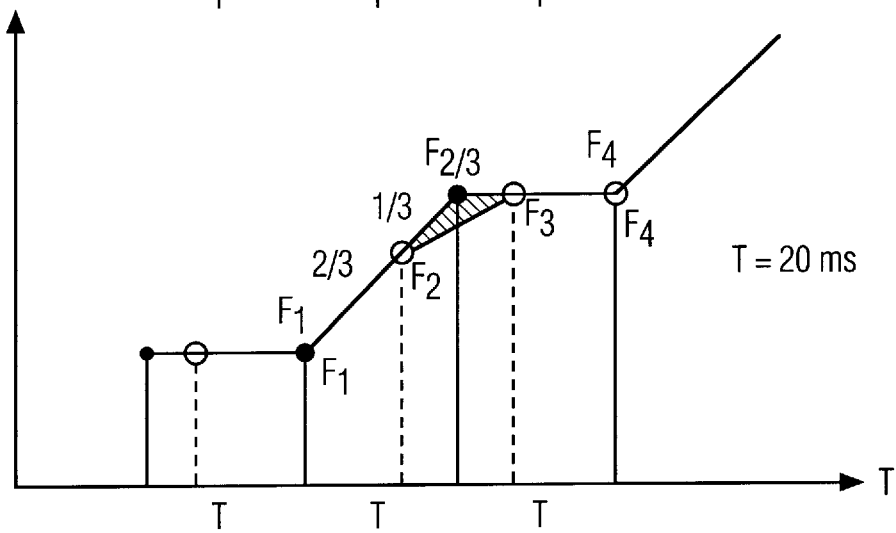
FIG. 16b    T = 20 ms
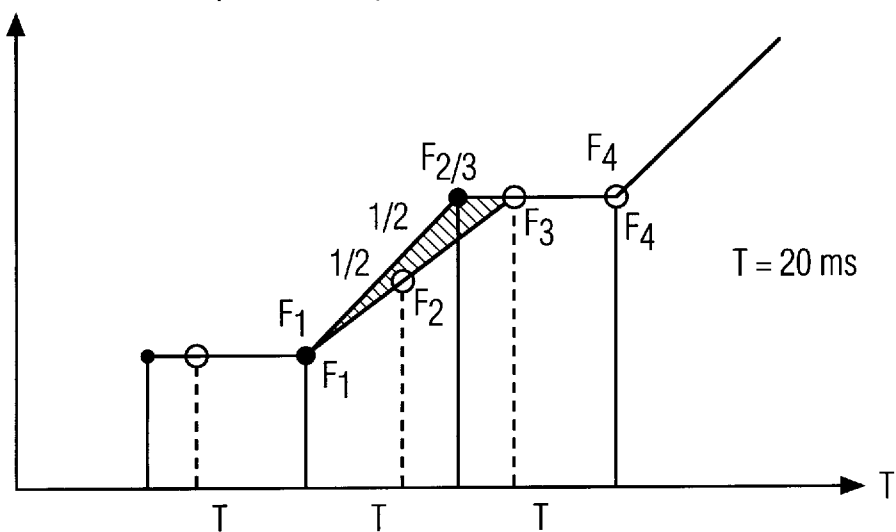
FIG. 16c    T = 20 ms

PROCESS FOR CORRECTION AND ESTIMATION OF MOVEMENT IN FRAMES HAVING PERIODIC STRUCTURES

The invention relates to a process for correcting the estimation of movement in frames having periodic structures. This process is particularly suitable for frame-conversion systems comprising a change of field frequency, in particular for converting an interlaced 50 Hz format into a progressive 75 Hz format. The invention applies in particular in the sphere of television.

The estimation of movement in the context of a frame-conversion system allows the performance of this system to be substantially enhanced. However, the presence of periodic structures in a frame can cause the process for estimating movement to fail and this can give rise to a very disturbed vector field unsuitable for temporal interpolation of the input fields.

Let us consider, for example, a zebra (with vertical stripes) running from left to right over-uniform savannah and filmed close up so as to cover a plurality of main blocks. It is therefore difficult to determine the correct movement vectors in these main blocks. If the successive stripes of the zebra are designated a, b, c respectively, a correct vector should make stripe a of the first frame correspond to stripe a of the following frame and so on for all stripes. A minimum is obtained in the error matrix comprising errors corresponding to each of the tested movement vectors.

However, the vector causing stripe a of the first frame to correspond to stripe b of field 2/3 and stripe of b of field 1 to stripe c of field 2/3 etc. also creates a minimum in the matrix.

In view of the digitisation noise and the noise inherent in the frame, the error corresponding to the correct movement vector may be greater than the minimum error-of the current matrix, this latter error therefore corresponding to an incorrect vector. By selecting the vector only by the criterion of minimum error, an error is therefore created which will be reproduced and will be visible during temporal interpolation of the input fields of the process over all parts of the animal in question where this ambiguity has not been resolved.

Detection of periodic structures and correction of the resultant estimate have been addressed in two European applications EP-A-93402507 of 11th Oct. 1993 and EP-A-95400721 of 31st Mar. 1995, both filed in the name of Thomson Consumer Electronics SA.

In both these application, once a block is considered to belong to a periodic structure, the movement vector of this block is determined from a set of candidate vectors. Of the candidate vectors, it is the one giving the smallest error. Candidate vectors are the vectors of adjacent blocks or a combination thereof.

Now this method of correcting movement vectors periodic block by periodic block can introduce different vectors for the blocks of the same structure. It can also allocate to these periodic blocks a vector having nothing to do with the desired movement if the adjacent block contains an object having a different movement.

The present invention relates to a process for correcting the estimation of movement in frames comprising periodic structures in a system for determining movement vectors by comparison of blocks of frames, an error matrix being associated with each block, characterised in that it comprises the stages of:

determining adjacent periodic blocks and selecting a single movement vector for all these blocks.

Thus, the correction of movement vectors is only applied once the periodic structure has been defined. There will be good homogeneity of movement in this structure.

According to a particular embodiment, the stage of selecting a movement vector itself comprises the stage of totalling the error matrices of the periodic blocks item by item.

Totalling of the matrices item by item allows a matrix to be obtained for all blocks and consequently allows criteria of selection of a movement vector to be had relative to this set. The totalled matrix is equivalent to the matrix which would have been obtained if movement had been estimated on a "macroblock" composed of all the periodic blocks.

According to a particular embodiment, all the adjacent periodic blocks in the same line of blocks are considered.

This case is restricted to periodic structures in the same line. However, as will be seen hereinafter, while allowing for the vector determined for a possible periodic structure of the previous line, this does not prevent a homogeneous vector field from being obtained in the region of the periodic zone, lines combined.

Limitation to a line allows the increase in the complexity of the system and the memory required in comparison with a movement estimating system without correction to be limited. In fact, conventional movement estimating systems generally proceed line by line and block by block.

It is obvious that the process according to the invention also applies to columns of blocks. The terms such as above or below will be replaced by to the left and to the right, etc.

According to a particular embodiment, the stage of selection of a movement vector also comprises the stage of determination of a set of candidate vectors and of selection as single vector of the candidate vector giving the minimum of error in the totalled matrix.

According to a particular embodiment, the stage of selecting a movement vector also comprises the stage of selection as single vector of one of the two vectors of the blocks on the left and right of the periodic blocks if the error in the totalled matrix corresponding to one of said two vectors is a local minimum in its line.

According to a particular embodiment, if none of said two vectors satisfies the previous condition, the vector giving the minimum of error of the totalled matrix is selected as single vector.

According to a particular embodiment, the single vector finally retained is the vector of a block immediately above one of the adjacent periodic blocks if it is also periodic and if the error associated with this block in the totalled matrix is a local minimum in its line.

As mentioned hereinbefore, this stage allows an escape from the limitation to one line of blocks.

The invention also relates to a process for detecting periodic structures in a movement estimating system based on blocks of frames comprising the stage of determining an error matrix for various movement vectors for a current block, the stage of determining the line of the matrix comprising the minimum error of the matrix, of determining the maximum error of said line as well as the stage of determining the smallest secondary minimum of said line, a condition for periodicity of a block being that said two minima are close in value, the estimation of movement of blocks considered periodic being corrected by the above-mentioned process, said detection process being characterised in that it comprises the stages of:

determining the greatest secondary maximum of said line, evaluating the noise level of the frame, employing the additional condition for determining the periodicity of a block:

the difference between at least one of the minima and the secondary maximum should be significant relative to the noise level of the frame.

The use of the secondary maximum to detect a periodic structure avoids, on the one hand, the inopportune detection of periodic structures in noisy uniform zones and, on the other hand, the cases of secondary minima created by the presence of noise.

According to a particular embodiment, a third condition has to be satisfied: the maximum error should be significant relative to the noise level of the frame.

According to a particular embodiment, the noise level of the frame is equal to the minimum, over all the blocks of a frame, of the minimum errors for each block and of the difference:

Errminabs=min{Errmin(i,j),(Errmax−Errmin(i,j))}
i=1, . . . ,a
j=1, . . . ,b wherein Errmin is the minimum error determined for the block (i,j), and wherein Errmax is the maximum error determined for the block (i,j), a and b the number of horizontal and vertical blocks of the frame.

It is obvious that the detection and correction processes can be applied independently of one another.

Further characteristics and advantages of the invention will emerge from the description of the non-limiting embodiment described hereinafter and illustrated in the drawings.

Figure 1:
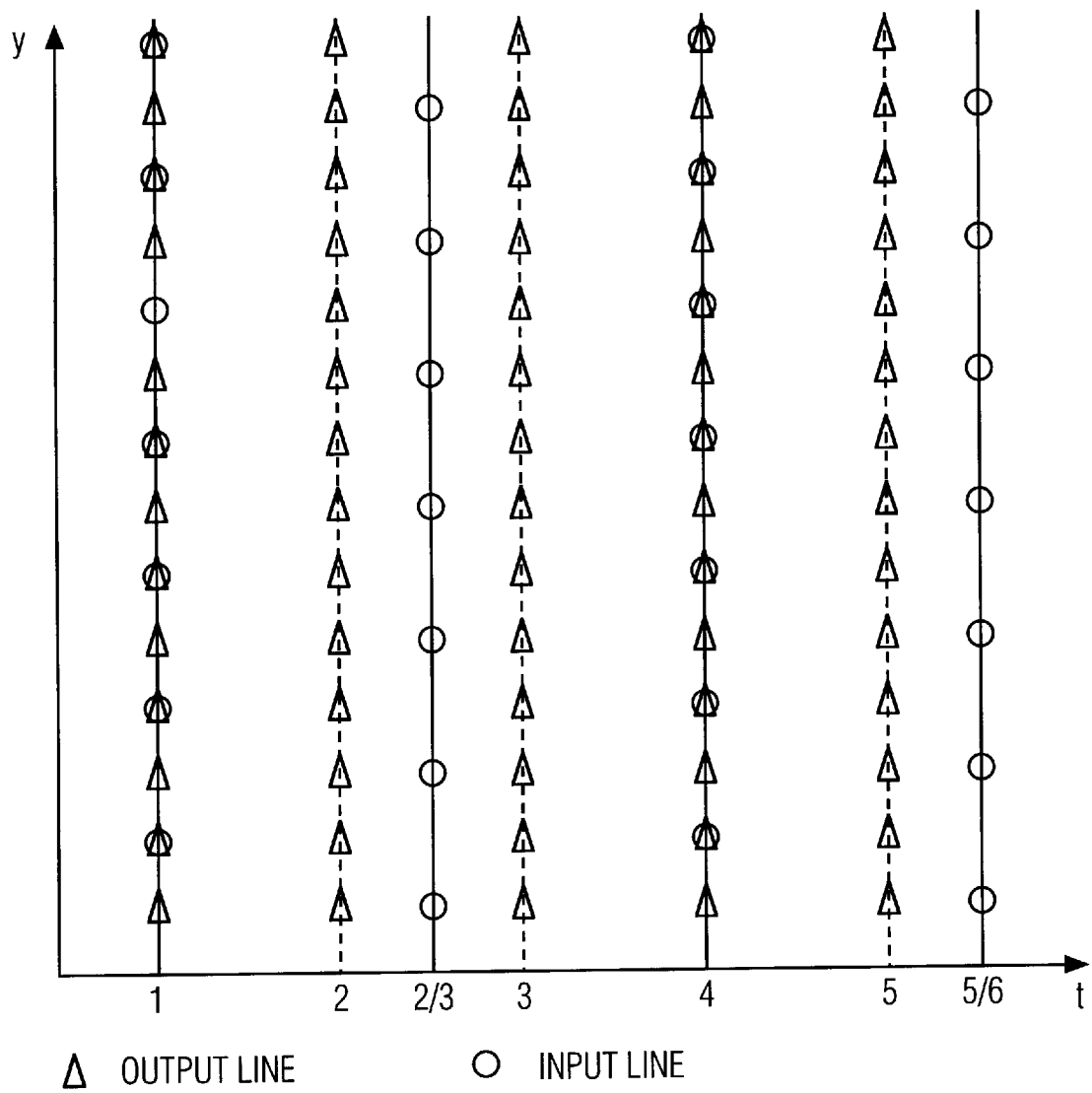
FIG. 1 is a diagram representing the input and output fields of the present process relative to the time axis.

FIG. 16 comprises three diagrams (a, b, c) of fields relative to time illustrating the normal mode of operation for video fields, the normal mode of operation for film fields and the specific mode of operation for film fields respectively.

The invention will be explained with reference to a process for converting interlaced television frame frequency of 50 Hz to 75 Hz progressive frames.

Co-pending applications Ser. No. 08/763,178 filed on 10th Dec. 1996, and Ser. No. 08/768,113 filed on 16th Dec. 1996 are concerned with related subject matter.

Conventions

A period is defined as being the time interval allowing an output field to be displayed, that is $1/75$ seconds. A cycle is defined as being the time interval required for a complete cycle of the algorithm, that is three periods or $1/25$ seconds.

The process is repeated identically every three output fields or every two input fields. By convention, the first output field bears the number 1, the second field bears the number 2, and so on. However, since processing is cyclical, fields 1, 4, 7 . . . are generated identically; they will be called type 1 fields. Similarly, fields 2, 5, 8 . . . , or fields 3, 6, 9 . . . respectively will be generated identically and will be called 2 and 3 type fields respectively.

By convention, the input fields will be numbered with reference to the position that they occupy relative to the output fields. Thus, an input field temporally corresponding to an output field will bear the same number as this output field. An input field situated between two output fields will bear the numbers of these two fields: for example, an input field situated between output fields 2 and 3 will be called field 2/3.

FIG. 1 illustrates the respective positions of the input and output fields.

Input field number 1 comprises the first line displayed on a television screen; it has been identified as line 0. This field, therefore the odd input field, is formed by lines 0, 2, 4, . . . , 624. An even field 2/3 will comprise lines 1, 3, 5, . . . , 623. The variable y will represent the line numbers increasing from the top to the bottom of the screen in the direction of scanning. The variable x will be used to denote the abscissa of a pixel and increases from left to right also in the direction of scanning. t will represent time, standardised so that one time unit represents a cycle. Field 1 will be situated at time 0, field 2/3 at time ½ and field 4 at time 1.

The output fields will comprise all the line numbers since they are progressive fields. The luminance signal at the position of a given pixel will be represented by the variable P(x, y, t).

General Diagram

The described conversion process and the device for carrying it out advantageously only require a single field memory. This constraint is explained by the fact that the process is intended to be implemented in mass-produced consumer appliances. The reduction in the production costs with regard to equipment is therefore an important factor.

Figure 2:
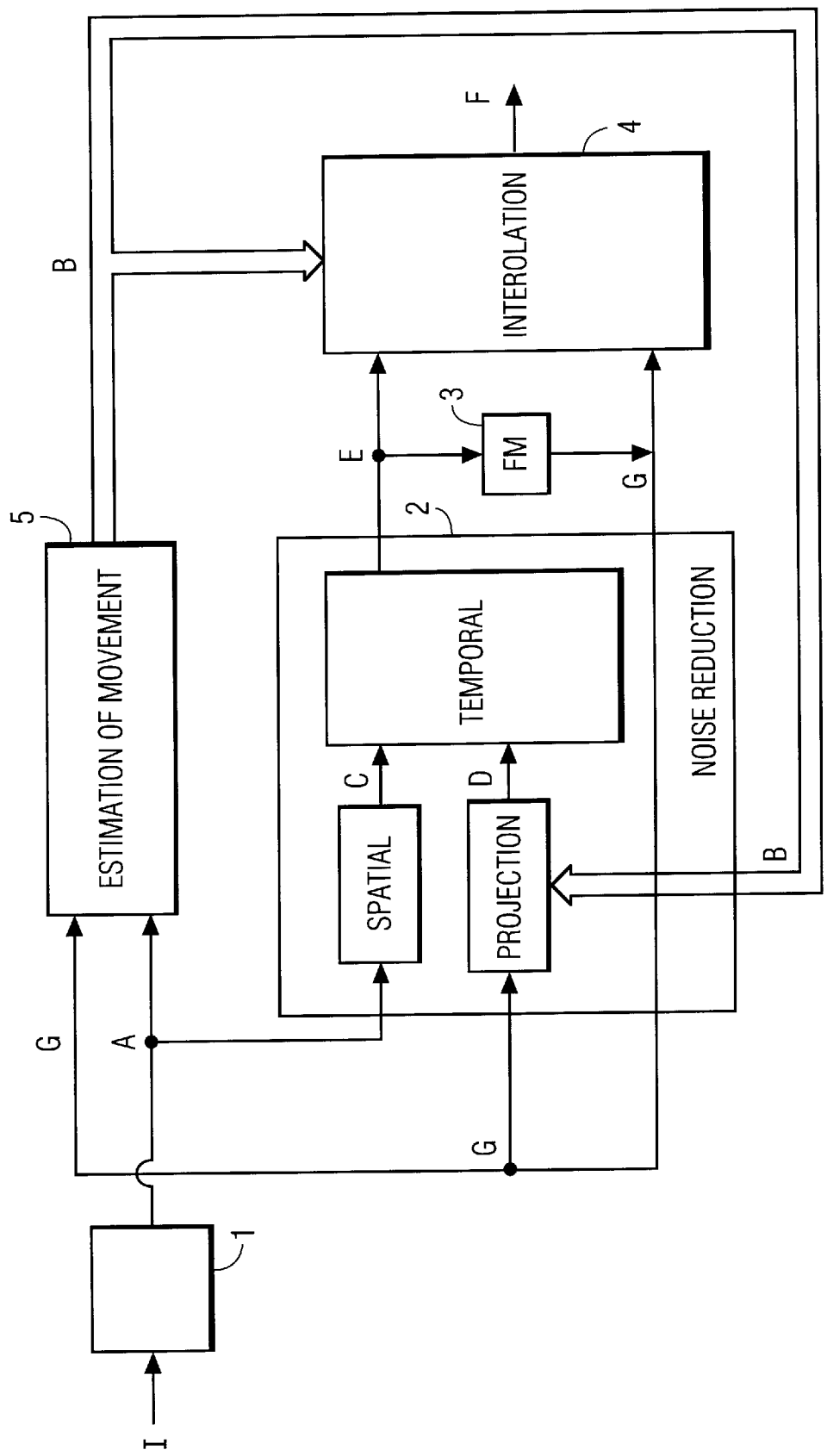
FIG. 2 is a block diagram of a device employing the process according to the present embodiment.

FIG. 2 is a block diagram of the device for carrying out the invention. Each element will be seen in detail hereinafter.

The device comprises a random-access memory 1 organised as FIFO and intended to increase the field frequency from 50 to 75 Hz by repeating one field in two by reading. The memory 1 therefore receives input fields at a frequency of 50 Hz and supplies fields at a frequency of 75 Hz.

The device also comprises a noise reduction circuit 2 comprising two filters: a spatial filter intended mainly to reduce pulsed noise and a recursive time filter. The spatial filter receives the fields issuing from the memory 1 then transmits the filtered fields to the time filter. The time filter also receives a field known as projected field composed of previously processed field information. The operation of the time filter will be described in detail hereinafter.

A temporally filtered field is stored in a field memory 3 and transmitted to an interpolator 4. The interpolator 4 interpolates between two input fields to deliver the output fields of the device. The interpolator 4 receives movement vectors on behalf of a movement estimating circuit 5. The movement is estimated between the field stored in the field memory 3 and the "current" field read in the memory 1. A certain amount of information relating to the estimation of movement is used during noise reduction.

Figure 3:
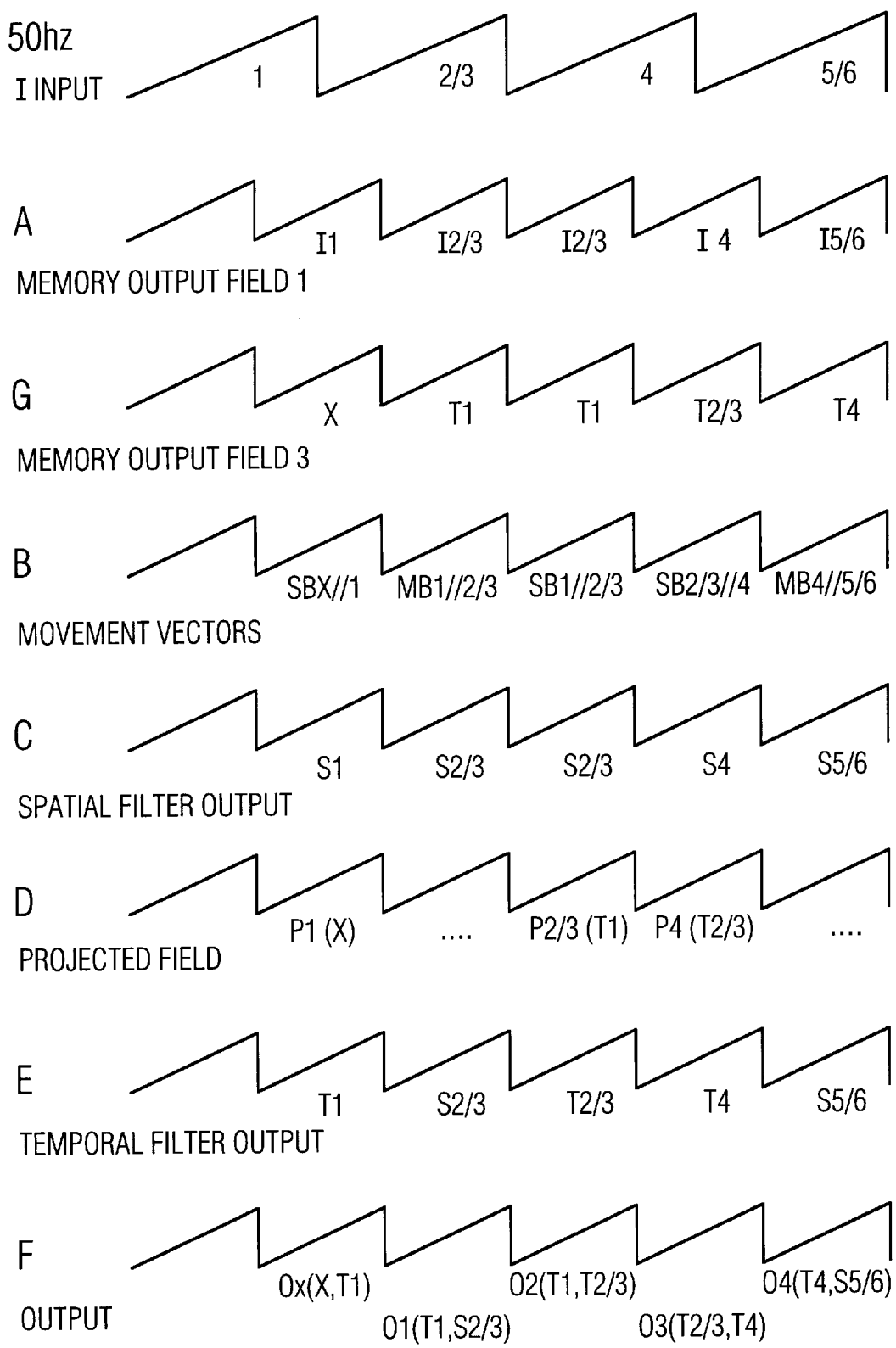
FIG. 3 is a timing diagram of the fields at certain points of the device in FIG. 2.
Figure 5:
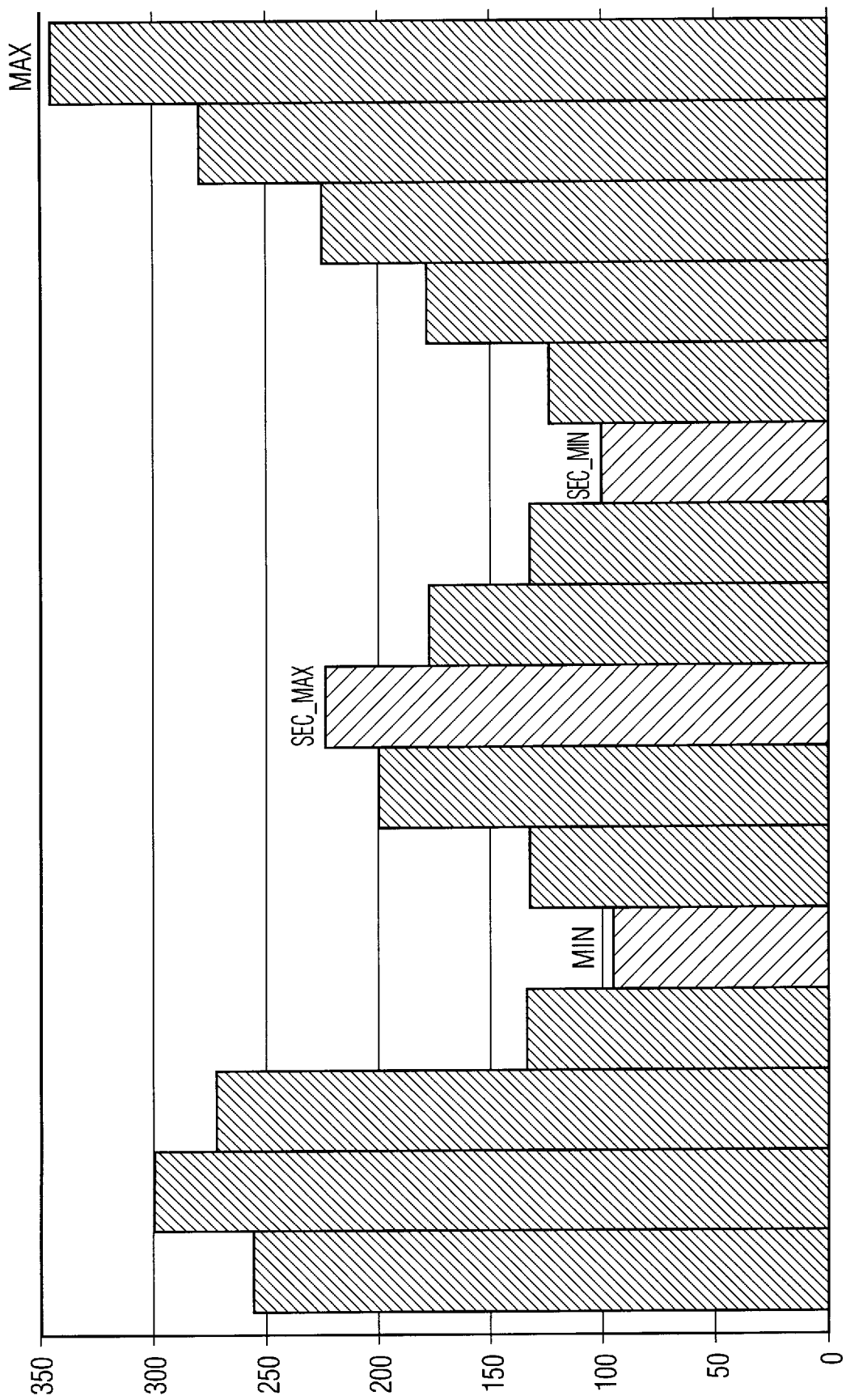
FIG. 5 is a histogram of the errors of a line of an error matrix associated with a vertical component of a given movement vector containing the smallest error of the matrix.

FIG. 3 comprises timing diagrams relating to the fields processed by the various elements of the device in FIG. 5. The letters identifying each timing diagram correspond to the letters identifying the connections between the elements of this last figure.

A field is shown in the form of a sawtooth corresponding to the scanning of this field.

The first timing diagram (I) corresponds to the input fields of the memory 1, that is to the fields interlaced at 50 Hz. The field 1 is odd, the field 2/3 even, etc.

The second timing diagram (A) corresponds to the output of the memory 1. The fields are read again at a rate of 75 Hz. The field 1 (and the fields 4, 7 . . . ) is read once, reading beginning before writing is completed. The field 2/3 (and the fields 5/6, 8/9 . . . ) is read twice.

The third timing diagram (G) shows the output of the field memory 3. This memory maintains a time deviation of one field between its input field and its output field so interpolation can be carried out correctly. To this end, the memory does not simply behave as a delay of one field. If this were the case, the filtered field 2/3 would be present at the input of the memory and at its output. It is therefore the filtered field 1 which is repeated twice at the output of the field memory.

The fourth timing diagram (B) shows the periods of calculation of information supplied by the movement estimator to the remainder of the device. As will be seen detail hereinafter, the movement estimator behaves differently in each period of a given cycle. For type 1 fields, coarse movement vectors are calculated (reference "MB") for wide blocks (known as main blocks) whereas finer movement vectors are determined for the other two fields (reference "SB") for sub-blocks of the main blocks. Calculation of the vectors for the sub-blocks is based on the coarse vectors of the main blocks. The reference "MB1//2/3" of the timing diagram indicates, for example, the period of estimation of "coarse" movement between field 1 and field 2/3.

The fifth timing diagram (C) concerns the output of the spatial filter of the noise-reducing circuit. This filtering is carried out directly on the field read in the memory 1.

The sixth timing diagram (D) shows the projected field compared by the noise-reducing circuit with the spatially filtered field.

The seventh timing diagram (E) indicates the output of the time filter and consequently the input of the interpolator 4 and of the field memory 3.

The last timing diagram indicates the output of the interpolator and therefore the output of the device itself.

Movement Estimator

The movement estimator operates by the process of comparison by multi-level blocks. This process takes place in two stages. The frame is firstly divided into coarse blocks or main blocks of 16*32 pixels of which the movement is determined, then these main blocks are divided into sub-blocks to refine the vector field.

Estimation is carried out for the luminance signal which generally contains sufficient information to describe the movements of objects on the screen. It is obviously possible also to use the chrominance information or to combine the chrominance and luminance information for estimation.

Above all, sub-sampling of input fields by a factor 2 is carried out in horizontal and vertical directions. The calculations required for estimation are therefore divided by four. However, the sub-sampled fields will only be used to estimate movement. The output fields will be interpolated from the complete fields.

This sub-sampling obviously restricts the components of the movement vectors to even values. This is not a problem in the vertical direction as this constraint is already imposed by the interlacing of the fields during broadcasting.

During sub-sampling, only the odd lines and the even columns will be retained. However, the points of the frame will still be labelled by means of the coordinate system used hitherto, while prohibiting pixels not belonging to the sub-sampled domain.

According to the present embodiment, before proceeding with sub-sampling, a low-pass filter intended to suppress the spatial high frequencies, sources of spectral superimposition, will be applied to the field. To achieve this horizontally, a triangular window having seven coefficients is used, for example:

$$P\text{horizontal}(x, y, t) = \frac{1}{16} [1\ 2\ 3\ 4\ 3\ 2\ 1] \begin{bmatrix} P(x-3, y, t) \\ P(x-2, y, t) \\ P(x-1, y, t) \\ P(x, y, t) \\ P(x+1, y, t) \\ P(x+2, y, t) \\ P(x+3, y, t) \end{bmatrix}$$

Filtering is also carried out in the vertical direction. As only the odd lines are retained, this corresponds to the numbers of vertically interpolated lines of the input field 1 and to the numbers of input lines of the field 2/3. In order to harmonise the spectral contents of the two sub-sampled input fields, low-pass filtering of the input field 2/3 is carried out:

$$P\text{sub-sampled}\left(x, y, \frac{1}{2}\right) = \frac{1}{4} \begin{bmatrix} P\text{horizontal}\left(x, y-2, \frac{1}{2}\right) \\ +2 P\text{horizontal}\left(x, y, \frac{1}{2}\right) \\ +P\text{horizontal}\left(x, y+2, \frac{1}{2}\right) \end{bmatrix}$$

For type 1 fields, odd lines are generated using a simple vertical average:

$$P\text{sub-sampled}(x, y, o) =$$

$$\frac{1}{2} [P\text{horizontal}(x, y-1, o) + P\text{horizontal}(x, y+1, o)]$$

Figure 7:
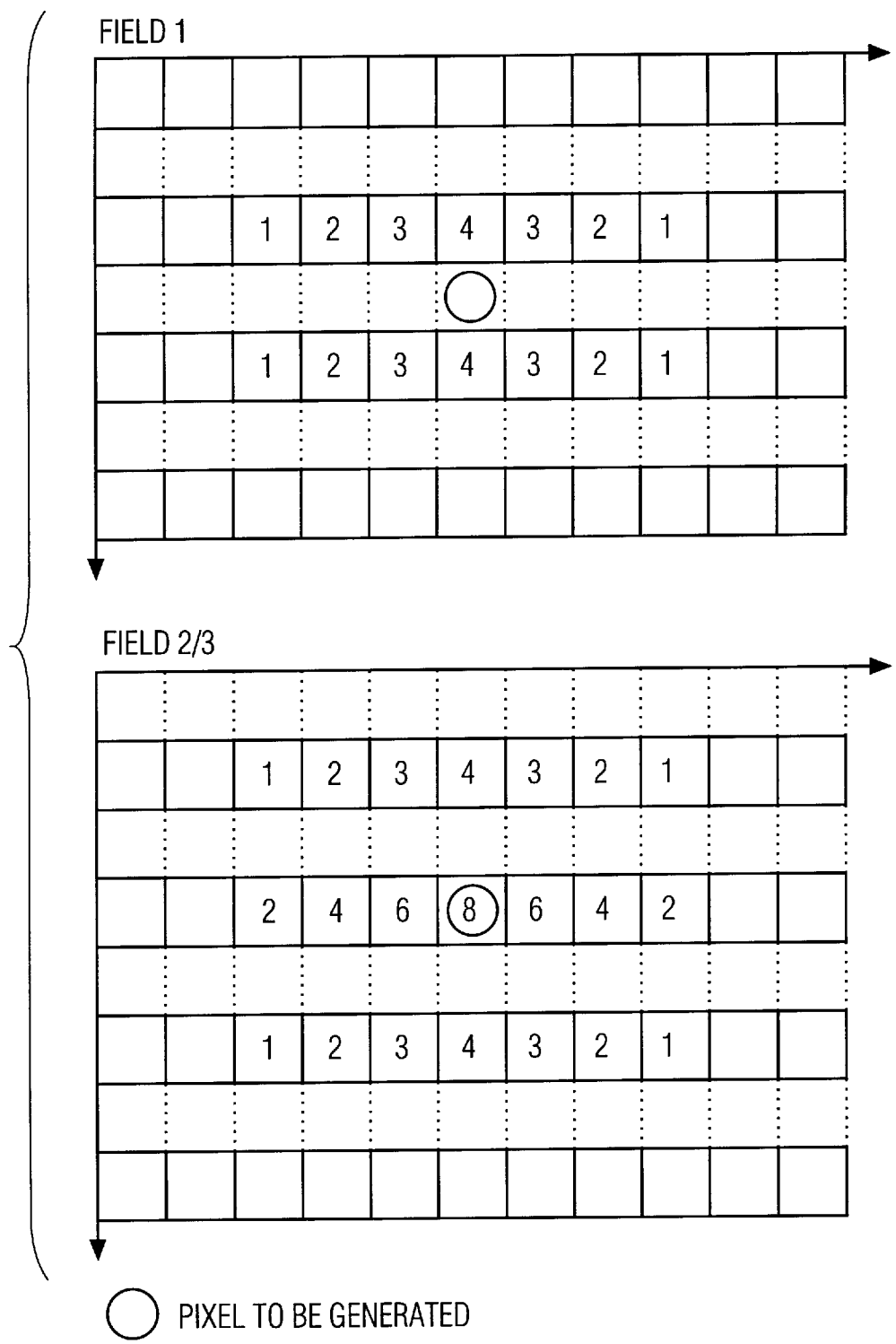
FIG. 7 shows two low-pass filters.

The sub-sampled functions (x,y,o) and $$\left(x, y, \frac{1}{2}\right)$$

are only defined for even x and odd y. For the sake of simplicity, the sub-sampled fields will be annotated P'(x, y, t). The filters used are shown in FIG. 7.

As already mentioned, the multi-level estimation process behaves differently during the three periods of a cycle:
- the vectors corresponding to the main blocks representative of the movement between fields 1 and 2/3 are calculated during period 1,
- the vectors corresponding to the sub-blocks more precisely representative of the movement between fields 1 and 2/3 are calculated during period 2, calculation being effected by means of the vectors determined during period 1,
- the vectors corresponding to the sub-blocks representative of the movement between fields 2/3 and 4 are calculated during period 3. In this latter case, calculation is effected from vectors of intermediate blocks which consist of updated values of vectors corresponding to the main blocks.

Determination of the Coarse Vector Field Between Fields 1 and 2/3

The frame is firstly cut up into main blocks of 32*16 pixels. As the size of an active frame is 720*576 pixels for the standard sampling frequency, there are therefore 23 main blocks per line and 36 per column.

For a main block indexed (i,j) with i between 0 and 22 and j between 0 and 35 and belonging by definition to the input field (the most recent field in time), therefore a field 2/3 or equivalent, the error committed for a movement vector (u, v) is defined by:

$$E_{(i,j)}(u,v) = \sum_{\substack{k=0,2,4,\ldots,30 \\ l=0,2,\ldots,14}} \left| P'\left[ \begin{pmatrix} M_x*i + k \\ M_y*j + l \end{pmatrix}, t \right] - P'\left[ \begin{pmatrix} M_x*i + u \\ M_y*j - v \end{pmatrix}, t - 1/2 \right] \right|$$

wherein Mx=32, size in abscissa of a main block,
and My=16, size in ordinate of a main block.

The error matrix is then calculated for each main block: each element of this matrix corresponds to an error linked to a possible movement vector, that is:

Err(i,j)=(E(i,j)(u,v)) when u=−16,−14, . . . , 14,16; v=−4, −2,0,2,4.

The components of the movement vectors are even and are between −16 and +16, and −4 and +4 respectively. The main block under consideration is therefore compared with blocks of a research window of a previous field, this research window being situated round the position of the main block related to this previous field. The vector retained from all the vectors is logged (u',v') and corresponds to the minimum of the error function.

Errmin=min(E(i,j)(u,v))=Err(i,j)(u',v')

when u=−16, −14, . . . , 14, 16 and v=−4,−2,0,2,4

The vector field of the entire frame is calculated by scanning, block by block, and by applying this research to each main block.

The noise of the frame is also estimated during calculation of the vector field of the main block level. An additional value is calculated for this purpose: maximum error of the matrix:

Errmax=max(E$_{(i,j)}$(u,v))
when u=−16, −14, . . . , 14, 16; v=−4,−2,0,2,4

Errmin represents an estimate of the sum of two noises: the noise inherent in the luminance signal and the noise for digitising the movement vectors. In fact, if the movement vector which has been calculated corresponds to the movement actually present in the frame, Errmin will be the sum of the differences in luminosity existing in two identical areas of the capacity of a main block: these differences will therefore have the noise of the frame as single origin.

On the other hand, if the movement is poorly represented by the calculated vector owing to the digitisation of the possible vectors, a component due to the error made on this vector will be added to the previous noise. Errmin will be too exacting to define the actual noise of the frame.

A second estimator, that is Errmax−Errmin, is consequently defined. It also depends on the frame digitisation noise. Over a uniform zone, the difference between the maximum error and the minimum error originates only from the noise of the frame. If the digitisation noise is high, that is Errmin and Errmax are both affected, it is hoped that this estimator is less sensitive to the digitisation noise eliminated by differentiation.

Two estimators Errminabs and Noiseest are also defined:
Errminabs=min{Errmin(i,j),(Errmax−Errmin)(i,j)}
i=0, . . . ,22
j=0, . . . ,35
Noiseest=min{(Errmin(i,j)}
i,j Corrections Made to the Calculations of Period 1

According to a variation, a first correction is made when the frame comprises uniform zones.

Over a uniform zone such as a piece of blue sky, the error matrix is approximately constant. Fluctuations are due to the presence of noise in the frame. The vector calculated by the process according to the invention is therefore unpredictable and can result in pronounced heterogeneity of the vector field which is harmful to the remainder of the process. In the presence of such heterogeneity, it is decided to force the corresponding vector to zero.

This force is in fact applied component by component. In fact, if a horizontal boundary is considered in the frame (a cliff topped by blue sky, for example), the component u of the movement vector is not fixed because the errors are constant over each line of the matrix. This component is therefore forced to zero. Similarly for component v in the event of a vertical boundary.

According to the present embodiment, the criterion employed to determine whether a vector component should be forced to zero is associated with the level of noise calculated above.

If Err(i,j)(0,v)−Err(i,j)(u,v)<Errminabs*threshold_x then u=0

If Err(i,j)(u,0)−Err(i,j)(u,v)<Errminabs*threshold_y then v=0 wherein Errminabs=min{Errmin(i,j),(Errmax−Errmin)(i, j)}
i=0, . . . ,22
j=0, . . . ,35

The values threshold_x and threshold_y are equal to multiples of 2: 2, 4, 8, . . . , for example.

In plain language, if the difference between the errors caused by the zero component vector and the vector found by estimation of movement is of the same order of magnitude as the estimated noise inherent in the frame, the correction is made.

According to the present embodiment of the invention, a correction is made when the frame contains periodic structures.

The problem posed by this type of structure has already been addressed the introduction. However, FIGS. 4 and 12 allow it to be clarified so the envisaged detection and correction can be understood better.

Figure 4:
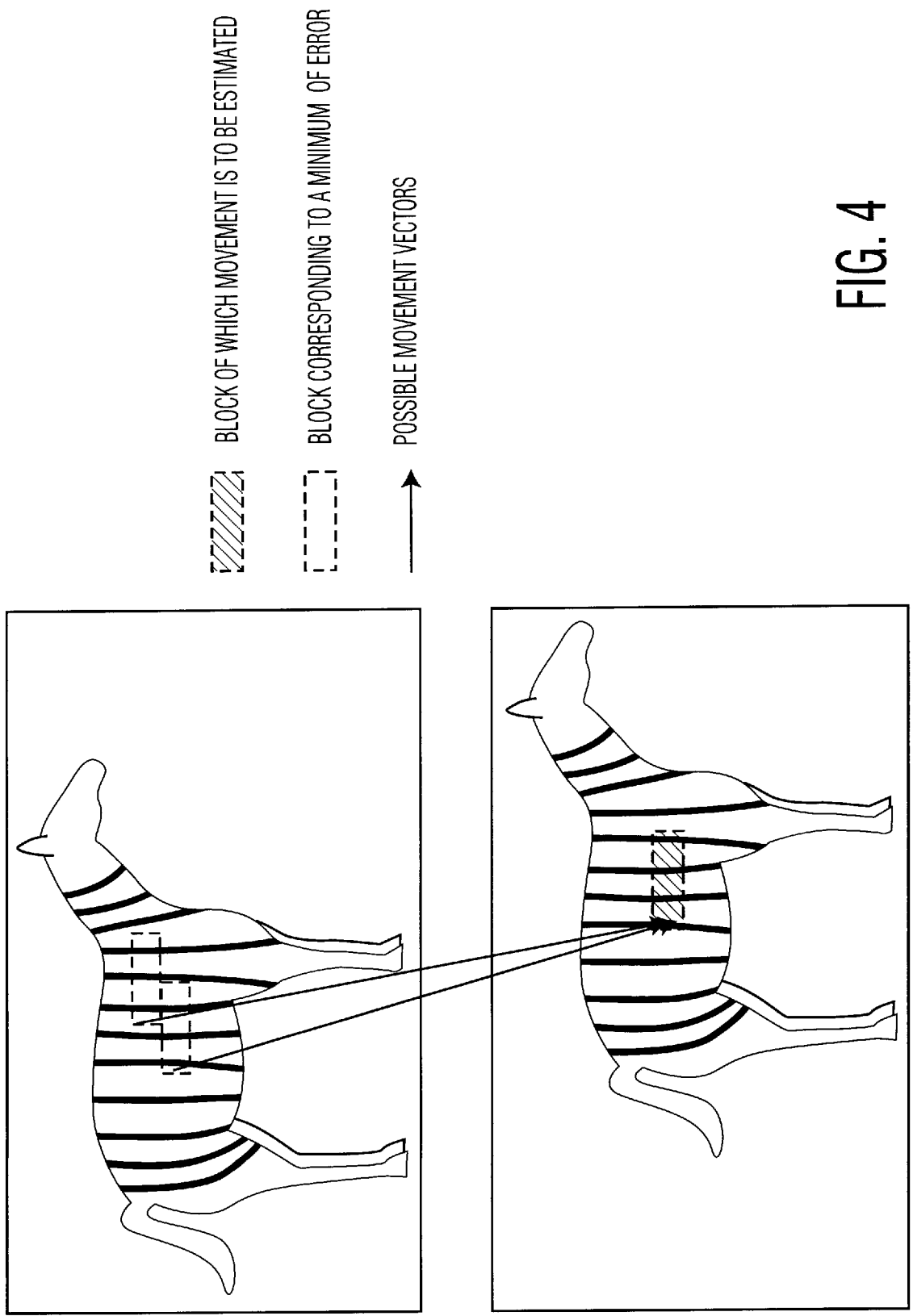
FIG. 4 shows a frame comprising periodic structures as well as an example of movement vectors which can be generated for such a frame.

The shaded block in FIG. 4 represents the block of which the movement is to be determined whereas the two blocks in broken lines represent two blocks in the reference frame giving rise to a minimum of error in the error matrix. An incorrect vector will generate very noticeable defects during interpolation of the output fields.

Figure 12:
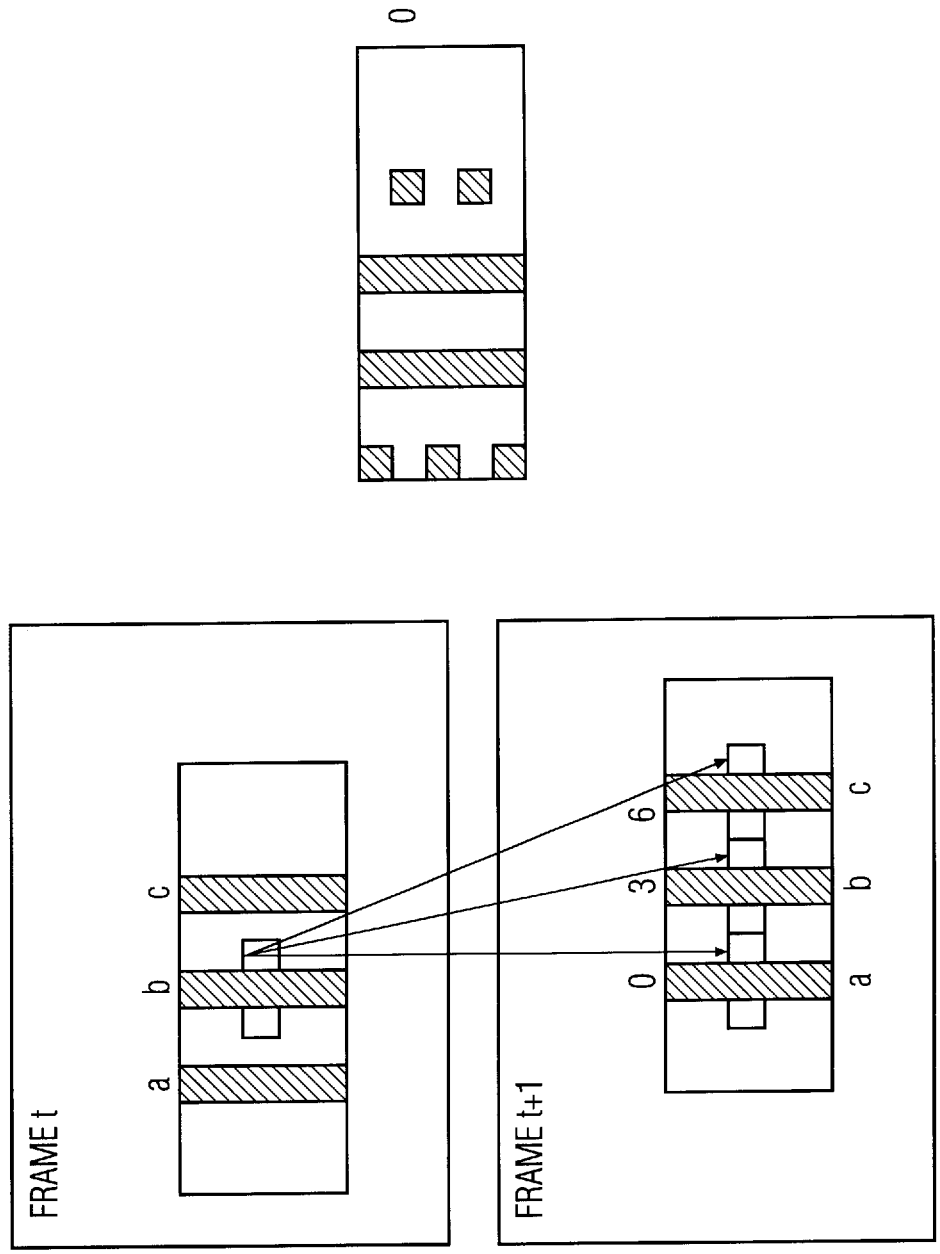
FIG. 12 illustrates a problem associated with the presence of periodic structures in the frame.

These defects are illustrated in close-up in FIG. 12 where the true movement of a block between two fields of opposing parity is given by a vector having a horizontal component of +2. If the movement vector is zero, the defects illustrated in the right-hand part of the figure appear during interlacing. The line height has been exaggerated to show the defects clearly.

In the context of the present embodiment we will restrict ourselves to horizontal periodicity (for example a zebra with vertical stripes) since the size of the main blocks and the range of possible vertical components of the movement vectors make this type of error unlikely in the vertical direction. The range of vertical components is too restricted to allow effective detection or correction. However, a skilled person could easily adapt the correction described hereinafter to vertical periodicity in particular.

Two stages will now be addressed: detection then correction of this type of error.

This type of defect is detected from the error matrix Err. In fact, the line containing the minimum of elements of the matrix will also contain one or more secondary minima as explained hereinbefore.

Firstly, the line (Row(u)) of errors containing the minimum wherein $-16<=u<=+16$ will be extracted from the matrix. Let umin be the index of the minimum in Row(u). The secondary minimum is initially detected. It is characterised as being a local minimum:

Row(u−1)>Row(u) and Row(u+1)>Row(u)

Only the smallest of the secondary minima satisfying the criterion will be retained. Let Usec_min be its index in line Row(u). The secondary maximum situated between the positions umin and usec_min is then detected. It is characterised as being a local maximum:

Row(u−1)<Row(u) and Row(u+1)<Row(u)

Only the largest of the secondary maxima satisfying the criterion is retained. Let usec_max be its index in Row(u).

The histogram in FIG. 5 represents a characteristic example of such a situation.

The secondary minimum and the absolute minimum as well as the secondary maximum are subjected to two additional tests to confirm the presence of a periodic structure:

the two minima should be close in value (C1), the difference between them and the secondary maximum should be significant relative to the current noise level (C2).

These precautions should be taken to prevent a main block on the edge of the zebra being considered as periodic. In fact, a main block can straddle the edge of the zebra, one half belonging to the animal and the other half to the savannah. This block can give a minimum of error which will however be greater than the minima associated with periodicity. A noisy error matrix is not therefore considered as periodic.

The following will be noted:

Errmin=Row(umin)

Errmax=Row(umax)

Err_sec_min=Row(usec_min)

Err_sec_max=Row(usec_max)

The following conditions are imposed:

(C1) Err_sec_min−Errmin<a*Errmax (C2) Err_sec_max−Err_sec_min>b*Errminabs (C3) Errmax>c*Errminabs According to the present example, a=0.5 b=2 c=4

An error line verifying all the conditions will issue from a matrix associated with a block probably containing a periodic structure.

According to a variation, only the first two conditions are combined.

The vector associated with this main block is then corrected.

Figure 6:
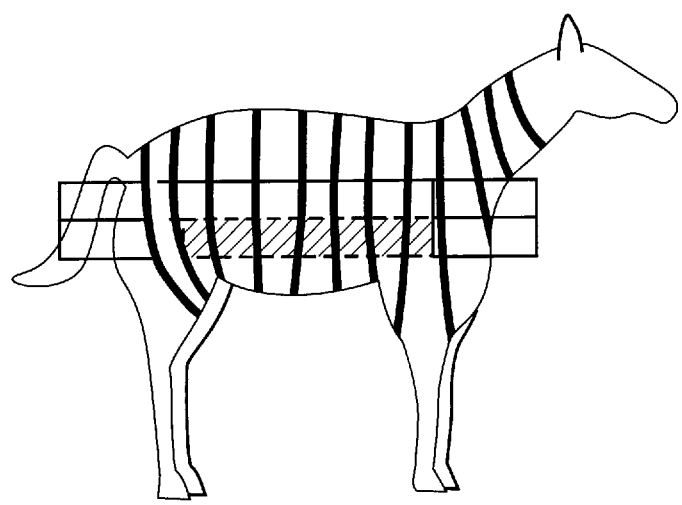
FIG. 6 illustrates the process employed to allow for periodic blocks in the determination of the vector field of movement of a frame.

For this purpose, it is not sufficient to take into consideration only the periodic main block. With reference to the drawing of the zebra, imagining that the entire portion of the animal not contained in the main block is deleted, a rectangle with vertical stripes is obtained. When seeking the portion of the previous frame to which this rectangle corresponds, several possible striped rectangles will be found and it will be impossible to decide which should be taken into consideration. To make this choice, the main block is gradually enlarged to remove the uncertainty. The process is illustrated in FIG. 6 where the shaded blocks are periodic blocks of one line of the frame.

In a given line, the detection of a periodic main block will indicate that an entire zone of the frame containing a periodic structure has been found. The movement vector of this main block will not be retained immediately. On the contrary, the error matrix corresponding to this block will be stored.

We pass to the following main block on the same line. If it is also periodic, its error matrix is again stored. We finally arrive at the end of the periodic structure, the right-hand edge of the zebra in this instance.

Let (i1,J1) be the coordinates of the first periodic main block encountered and (i2,J1) those of the last. All the matrices stored are totalled item by item. A matrix is obtained of which the components are:

for all $u \in [-16,-14, \ldots ,14,16]$ and for all $v \in [-4, \ldots ,4]$
Sum(u,v)=ΣErr(i,j)(u,v)
i=i1,i2
j=j1

The same error matrix would have been obtained if the basic algorithm had been applied to a main block of width (i2−i1+1) times the width of a single main block. The error matrix is obviously of the same size.

This matrix is not yet sufficient for determining the good movement vector. The blocks at the beginning and at the end of the periodic structure should be considered. In fact, these blocks generally contain the edge of the periodic zone in movement and therefore allow the ambiguity of the information contained in the error matrix to be removed.

After having determined the foregoing matrix, the procedure is as follows:

The vectors of the two main blocks are considered at the beginning and end of the periodic structure. The corresponding error is extracted from the sum matrix for each one. The vector of which the error is smallest will be retained.

If this vector does not correspond to a local minimum of its line of the error matrix Sum, the minimum of the error matrix is selected and the corresponding vector is retained.

Finally, for obtaining vertical coherence between the adjacent periodic blocks, it is tested whether one of the blocks immediately above this row of periodic blocks is also periodic and, if so, its vector is retained providing that it corresponds to a minimum in the line of the error matrix.

The vector retained will thus be the vector used for all blocks of the periodic structure.

After having effected determination of the vectors and possibly the first and or second correction, a vector field is obtained annotated:

$\overrightarrow{MB}(i,j)$ wherein $0 \leq i \leq 22$ and $0 \leq j \leq 35$

Refinement of the Spatial Resolution of the Vector Field

This phase of the process is employed twice in succession during periods 2 and 3.

Attempts are made to characterise the movement more finely by attributing vectors to smaller elements: the sub-blocks (which have a size of 4*4 pixels in the present example). This will allow the vector field to be better adapted to the edges of moving objects.

According to the present example, there are 180 sub-blocks in a frame width and 144 sub-blocks in height.

According to the present embodiment, the errors associated with the entire range of possible movement vectors are not all recalculated, as effected for the main blocks. For each sub-block, candidate vectors are selected from among the vectors of the main blocks and the error generated by each of these candidate vectors is determined.

In the context of the present example, the candidate vectors for a sub-block are the vectors of the four main blocks closest to this sub-block. The vector generating the smallest error will be attributed to the sub-block.

The fact that candidate vectors associated with main blocks adjacent to the block containing the sub-block under consideration are used allows the edges of moving objects to be determined precisely and, consequently, the boundaries of zones with uniform movement. If the edge of a moving object projects just slightly into a main block, the vector found for it will be a vector indicating the background and not the moving object because the majority of the pixels of this main block belong to this background, of which the movement can be different from that of the object. Consequently, the edge of the object will not be correctly reconstituted.

On the other hand, if the vectors of the adjacent main blocks are also considered for the sub-blocks of the edge of the object, the movement of these sub-blocks will be correctly estimated since at least one of the adjacent main blocks will form part of the object under consideration.

Field 2

Attempts are made to determine the vector field minimising the difference in the luminances of the sub-blocks between fields 1 and 2/3. However, the output field 2 will ultimately be displayed. To improve precision, the sub-blocks are consequently considered as forming part of this field 2.

Figure 8:
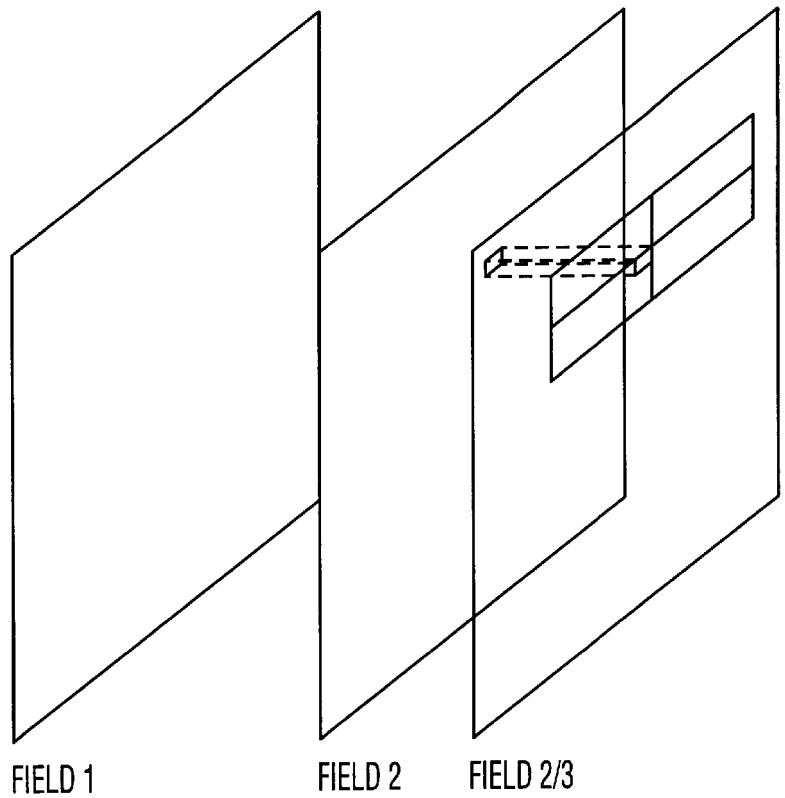
FIG. 8 shows the fields 1, 2 and 2/3 and the position of a sub-block relative to the main blocks of which the vectors are selected as candidate vectors for the sub-block.
Figure 9:
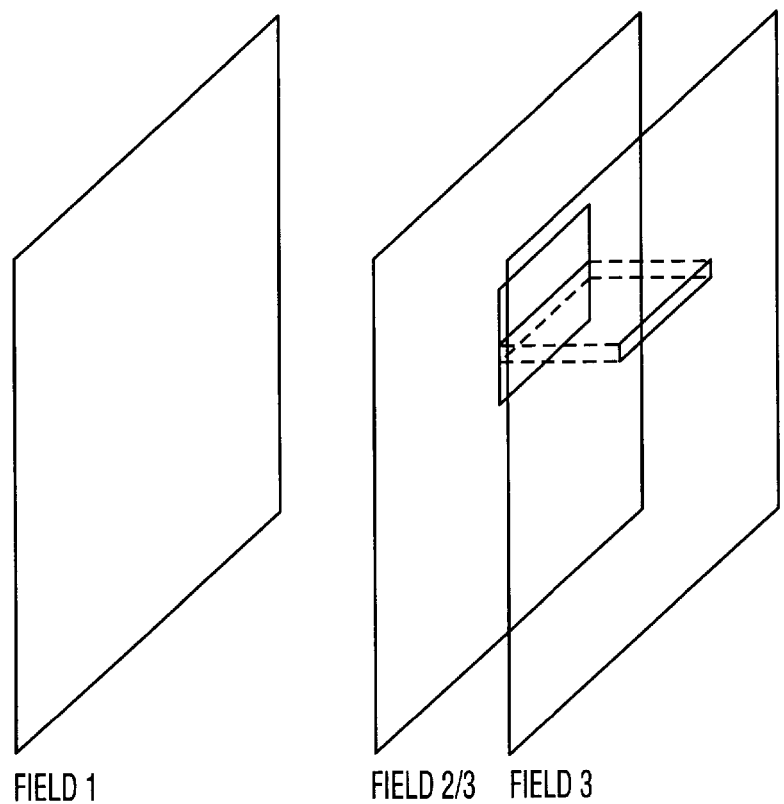
FIG. 9 shows the fields 1, 2/3 and 3 and the position of an intermediate block relative to the main blocks of which the vectors are used as candidate vectors.

For each sub-block of the field 2, four adjacent main blocks are determined in the following manner: the sub-block is projected orthogonally on the field 2/3 (see FIG. 8). The four closest blocks will therefore be selected as follows:

When speaking of the sub-block (i,j) (0<i<180, 0<j<144), it will be said that the four relevant main blocks are:

If imod 8<4 then i'=−1 otherwise i'=1
If jmod 4<2 then j'=−1 otherwise j'=1
$\text{Rel}_{(i,j)}(1) = \overrightarrow{MB}(i \vee 8, j \vee 4)$
$\text{Rel}_{(i,j)}(2) = \overrightarrow{MB}(i \vee 8+i', j \vee 4)$
$\text{Rel}_{(i,j)}(3) = \overrightarrow{MB}(i \vee 8, j \vee 4+j')$
$\text{Rel}_{(i,j)}(4) = \overrightarrow{MB}(i \vee 8+i', j \vee 4+j')$ wherein the quotient of the euclidian division of a by b is annotated a∨b and its remainder amodb.

Once the candidate vectors have been selected, they should be compared with one another. As mentioned above, the sub-block forms part of the displayed field. The vector of the main block in question is therefore put to scale. 2/3 thereof are initially calculated and the result is rounded. The vector of movement between field 1 and field 2 is thus obtained. The remaining vector corresponds to the movement between field 2 and field 2/3. If these two vectors are called rear vector and front vector respectively, we have:

When m=1,2,3

$$\text{Rear}_{(i,j)}(m) = int\left(\frac{2}{3} \cdot \text{Rel}_{(i,j)}(m)\right)$$

$$\text{Front}_{(i,j)}(m) = \text{Rel}_{(i,j)}(m) - \text{Rear}_{(i,j)}(m)$$

The four errors associated with these four vectors are then calculated:

When m=1,2,3,4

$$\text{Err}_{(i,j)}(m) = \sum_{\substack{k=0,2 \\ l=0,2}} \left| P'\left[\begin{pmatrix} S_x \cdot i + k \\ S_y \cdot j + l \end{pmatrix} + \text{Front}_{(i,j)}(m), \frac{1}{2}\right] - P'\left[\begin{pmatrix} S_x \cdot i + k \\ S_y \cdot j + l \end{pmatrix} - \text{Rear}_{(i,j)}(m), 0\right]\right|$$

wherein Sx and Sy represent the sizes in abscissa and ordinate pixels of a sub-block.

The vector of the sub-block will be the vector giving a minimum error. By scanning all the sub-blocks, a vector field annotated Raw(i,j) is obtained.

According to a variation, the components of the field vectors are subjected to median filtering to eliminate spurious values: in fact, a small error in a sub-block is less visible than local heterogeneity of the vector field.

Assuming:

$a = (1 \; 0) \cdot \text{Raw}_{(i-1,j)}$; $a' = (0 \; 1) \cdot \text{Raw}_{(i-1,j)}$ $b = (1 \; 0) \cdot \text{Raw}_{(i,j)}$; $b' = (0 \; 1) \cdot \text{Raw}_{(i,j)}$ $c = (1 \; 0) \cdot \text{Raw}_{(i+1,j)}$; $c' = (0 \; 1) \cdot \text{Raw}_{(i+1,j)}$ The vector field is thus written $$SB_2(i,j) = \begin{pmatrix} med(a,b,c) \\ med(a',b',c') \end{pmatrix}.$$

Median filtering is therefore carried out for a given sub-block by taking into consideration the vector previously calculated for this sub-block and the vectors of horizontally adjacent sub-blocks.

A vector field for sub-blocks of 4*4 pixels is thus obtained.

The error associated with the selected vector is also defined for each sub-block. This error is a measure of the confidence placed in each movement vector. The error is written:

$$Err_{(2)}(i,j) = \sum_{\substack{k=0,1,2,3 \\ l=0,2}} \left| P'\left[ \begin{pmatrix} S_x \cdot i + k \\ S_y \cdot j + l \end{pmatrix} + \text{Front}(i,j), \frac{1}{2} \right] - P'\left[ \begin{pmatrix} S_x \cdot i + k \\ S_y \cdot j + l \end{pmatrix} - \text{Rear}(i,j), 0 \right] \right|$$

Field 3

As effected for field 2, calculation of vectors in the region of the sub-blocks is effected for field 3 while estimating the movement between fields 2/3 and 4. However, the calculation is different from that previously effected. In fact, according to the present embodiment, movement vectors are not calculated for main blocks between fields 2/3 and 4, in order to save delay lines. In fact, if the vectors of the main blocks and those of the adjacent sub-blocks had to be calculated for field 3, the vectors of all the adjacent main blocks would have to be calculated for a given sub-block, and this would introduce a delay corresponding approximately to the number of lines contained in a row of main blocks.

The vectors of the sub-blocks for field 3 will be calculated from the vector field previously calculated for the main blocks between fields 1 and 2/3. This poses problems in the event of rapid movements since the vectors of the sub-blocks will thus be calculated from vectors no longer reflecting the actual movement.

According to the present embodiment, the information concerning the main blocks is updated by creating a vector field for blocks known as intermediate blocks of which the size is exactly intermediate between that of a main block and that of a sub-block.

According to the present embodiment, the intermediate blocks have a size of 32 pixels per 4 lines: they have the width of a main block and the height of a sub-block. The vector field having average spatial resolution associated with these intermediate blocks is calculated from fields 2/3 and 4 and from the vector field of the main blocks determined for fields 1 and 2/3. The vector field of the sub-blocks will be deduced therefrom in a second stage. It can be seen that if the vector field determined between fields 1 and 2/3 is taken as source of candidate vectors, the error calculations will still be effected from the information of fields 2/3 and 4.

As with the sub-blocks of field 2, it is considered that the calculations are effected for intermediate blocks belonging to the output field, that is field 3. As before, the movement vectors to be applied to the intermediate blocks will be broken down into two vectors. Thus, for a vector (u,v), a front and a rear vector will be determined as follows:

$$\text{Front} = \frac{2}{3}(u,v)$$
$$\text{Rear} = (u,v) - \text{Front}$$

The error associated with the movement vector (u,v) for an intermediate block (i,j) will be written:

$$Err_{Intermediate}(i,j) = \sum_{\substack{k=0,1,2,\ldots,30 \\ l=0,2}} \left| P'\left[ \begin{pmatrix} M_x \cdot i + k \\ S_y \cdot j + l \end{pmatrix} + \text{Front}(i,j), \frac{1}{2} \right] - P'\left[ \begin{pmatrix} M_x \cdot i + k \\ S_y \cdot j + l \end{pmatrix} - \text{Rear}(i,j), 1 \right] \right|$$

For a given intermediate block of field 3, the main block corresponding to it is determined: it is the main block which, projected orthogonally on field 3, contains this intermediate block.

A certain number of candidate vectors for a given intermediate block (i,j) is determined:

the vector of the corresponding main block, the vector deduced from the above-mentioned vector of the main block by modifying its horizontal component by one digitisation step in the positive direction, the vector deduced from the above-mentioned main block by modifying its horizontal component by one digitisation step in the negative direction, the vector of the main block closest (above or below) the intermediate block, the vector deduced from the above-mentioned main block by modifying its horizontal component by one digitisation step in the positive direction, the vector deduced from the above-mentioned main block by modifying it horizontal component by one digitisation step in the negative direction.

According to the present embodiment, the six candidate vectors will therefore be:

If jmod4<2 then j'=−1 otherwise j'=1

$$Rel^{IB}(i,j)(1) = MB(i, jv4)$$

$$Rel^{IB}(i,j)(2) = MB(i, jv4) + \begin{pmatrix} 2 \\ 0 \end{pmatrix}$$

$$Rel^{IB}(i,j)(3) = MB(i, jv4) + \begin{pmatrix} -2 \\ 0 \end{pmatrix}$$

$$Rel^{IB}(i,j)(4) = MB(i, jv4 + j')$$

$$Rel^{IB}(i,j)(5) = MB(i, jv4 + j') + \begin{pmatrix} 2 \\ 0 \end{pmatrix}$$

$$Rel^{IB}(i,j)(6) = MB(i, jv4 + j') + \begin{pmatrix} -2 \\ 0 \end{pmatrix}$$

wherein the quotient of the euclidian division of a by b is annotated a∨b and its remainder amodb.

The second and third vectors have the same vertical component as the first vector, the horizontal components being modified. Similarly, the fifth and sixth vectors have the same vertical component as the fourth vector, the horizontal components being modified. This choice is due to the size of the intermediate blocks which only have two lines of height. If intermediate blocks having a greater vertical size had been selected, correction of the vertical component could have been considered. Here, however, with only two lines per intermediate block, it is difficult reliably to determine a vertical component and therefore a fortiori to correct it.

The error associated with each of the six vectors is thus calculated for each intermediate block. The vector retained for an intermediate block from among the six candidate vectors is that giving the minimum error.

According to a variation, the correction to the horizontal components is eliminated. This avoids excessive discontinuities in the vector field in the event of noisy frames.

A vector field having average spatial resolution annotated IB(i,j) is finally obtained.

The last stage of estimation of movement of field 3 involves determining a vector field of sub-block level from the vector field with intermediate blocks. A sub-block will obviously be attributed to the intermediate block of which it forms part. According to the present example, two candidate vectors are determined for each sub-block. The first candidate vector is that of the intermediate block of which the sub-block forms part whereas the second vector is that of the adjacent intermediate block as defined hereinafter.

For a sub-block having coordinates (i,j), the two candidate vectors will be

If imod8<4 then i'=−1 otherwise i'=1

$Rel_{(i,j)}(1) = IB(i \vee 8, j \vee 4)$ $Rel_{(i,j)}(2) = IB(i \vee 8 + i', j \vee 4)$ The vectors:

When m=1,2

$$Front_{(i,j)}(m) = int\left(\frac{2}{3} \cdot Rel_{(i,j)}(m)\right)$$

$$Rear_{(i,j)}(m) = Rel_{(i,j)}(m) - Front_{(i,j)}(m)$$

will therefore be calculated.
Then the errors:
When m=1,2

$$Err_{(i,j)}(m) = \sum_{\substack{k=0,2 \\ l=0,2}} \left| P'\left[\begin{pmatrix} S_x \cdot i + k \\ S_y \cdot j + l \end{pmatrix} + Front_{(i,j)}(m), 1\right] - P'\left[\begin{pmatrix} S_x \cdot i + k \\ S_y \cdot j + l \end{pmatrix} - Rear_{(i,j)}(m), \frac{1}{2}\right] \right|$$

The vector giving the smallest error will be retained.

The vector field $(SB_3(i,j))$ is also subjected to median filtering, and the corresponding error field $(Err_3(i,j))$ will be calculated.

Noise Reduction

Noise reduction involves two stages:

a reduction of spatial noise, a reduction of time noise compensated in movement.

The first stage makes use of the information contained in a single field whereas the second stage makes use of the information contained in several successive fields, two in this instance.

Hereinafter, only filtering of luminance will be described.

In the context of the present example, spatial filtering of chrominance is not considered necessary, the chrominance samples being too remote from one another for the median filter of directional type to have a direction. It is obvious that chrominance could also be filtered, particularly if the chrominance information is denser, in particular if it had resolution identical to that of luminance.

Temporal filtering of chrominance is deduced directly from that of luminance by considering the input fields of which the size is divided by the factor of sub-sampling of chrominance (that is by 2 in the direction of the x abscissae for an input format 4:2:2). The x component of the movement vectors should also be divided by this same factor.

Spatial Noise Reduction

The spatial reduction of noise is intended to reduce the pulsed noise in the input fields.

According to the present embodiment, the spatial filter is a directional median filter which has the advantage of not degrading the fronts and fine textures of a frame. Simple linear or median filtering would not have this advantage.

Directional median filtering is carried out here on three pixels: the "current" pixel as well as two adjacent pixels situated on the same straight line passing through the current pixel. In view of these restrictions, four directions of filtering are possible: horizontal, vertical and two diagonals.

The choice of the direction to be considered is made as a function of the correlation existing between the three pixels of the same direction.

The following table shows the current pixel (X22) surrounded by its adjacent pixels:

| X11 | X12 | X13 |
| X21 | X22 | X23 |
| X31 | X32 | X33 |

The horizontal direction (called d1) passes through pixels X21, X22 and X23.

The vertical direction (called d2) passes through pixels X12, X22 and X32.

The first diagonal direction (d3) passes through pixels X31, X22 and X13.

The second diagonal direction (d4) passes through pixels X11, X22 and X23.

The correlation coefficients associated with each of the directions are respectively annotated c1 to c4 and the filtered values m1 to m4.

According to d1:

c1=min(|x21−x22|,|x23−x22|)

m1=med(x21,x22,x23)

According to d2:

c2=min(|x12−x22|,|x32−x22|)

m2=med(x12,x22,x32)

According to d3:

c3=min(|x13−x22|,|x31−x22|)

m3=med(x13,x22,x31)

According to d4:

c4=min(|x11−x22|,|x33−x22|)

m4=med(x11,x22,x33)

The direction in which the correlation coefficient is weakest will be retained.

Other correlation functions can also be selected. Similarly, filtering can be carried out on more than three pixels or in more than three directions if the window used allows.

Reduction of Temporal Noise Compensated in Movement

A significant advantage in the estimation of movement is that it allows the application of noise reduction processes compensated in movement.

The hypothesis that the noise disturbing a television picture has a statistical expectation of approximately zero is used as a starting point, that is its time average over several pictures tends to zero. The high-frequency components of this noise can therefore be reduced by effecting low-pass temporal filtering of the frame.

A known filtering process involves carrying out recursive digital filtering pixel by pixel. This process involves the storage, for each pixel, of a certain number of samples and the application of a recursion equation between these stored values and a current pixel. A filtered value can thus be determined for this current pixel and the stored values can be updated. The choice of the recursion equation and the number of terms stored determine the effectiveness of the filter.

However, the application of a low-pass time filter to a sequence of television pictures has a major defect: owing to the very nature of this filtering, it creates a trail following all moving objects, this phenomenon being similar to that seen on a cathode ray tube having pronounced remanence. This effect is very visible on certain commercial television sets.

According to the present embodiment, this effect is reduced by using the movement vectors already calculated when employing the recursion equation. Recursion will be effected not on the pixels of stationary coordinates but on the pixels translated by movement vectors. In other words, the displacement of the objects is followed so that the pixels which are frames of the same point of the moving object correspond.

In the context of the present example, time noise is reduced by means of a single field memory on the input fields (spatially filtered). The vector field with maximum precision will be employed, that is the vector field of the sub-blocks. The vectors will initially be calculated from the stored field and the input field of which the noise is not reduced. The vector field thus obtained will be used to reduce the noise of the input field. Interpolation will be carried out between the input field processed in this way and between the stored field. The two fields used for interpolation will therefore have been subjected to noise reduction.

In the context of the present example, a single field memory is used: only a single sample in the past is retained for each pixel. The recursion will therefore relate to two terms: the "current" pixel and a stored sample.

Noise reduction is articulated into parts:

matching of the pixels to which the recursion equation will relate application of the recursion equation.

The pixels are matched sub-block by sub-block of the input field. The pixels of a sub-block of the input field and the pixels of the sub-block designated by the corresponding movement vector in the stored field are matched. The stored field is therefore projected according to the field of movement vectors.

If the luminance of the input field is designated by $$P\left[\begin{pmatrix}x\\y\end{pmatrix},t\right],$$

that of the noise-reduced field contained in the memory by $$\hat{P}\left[\begin{pmatrix}x\\y\end{pmatrix},t\right]$$

and that of the projected field by $$\hat{P}\left[\begin{pmatrix}x\\y\end{pmatrix},t\right],$$

the latter is written, for field 2/3:
$\forall x \in \{0,1,\ldots,720\}$
$\forall y \in \{1,3,5,\ldots,575\}$ $$\hat{P}_{2/3}\left[\begin{pmatrix}x\\y\end{pmatrix},\frac{1}{2}\right]=\hat{P}_1\left[\begin{pmatrix}x\\y\end{pmatrix}-SB_2(i,j),0\right]$$

wherein
i=xmod4
j=ymod4
and for field 4:
$\forall x \in \{0,1,\ldots,720\}$
$\forall Y \in \{0,2,4,\ldots,574\}$ $$\hat{P}_4\left[\begin{pmatrix}x\\y\end{pmatrix},1\right]=\hat{P}_{2/3}\left[\begin{pmatrix}x\\y\end{pmatrix}-SB_3(i,j),\frac{1}{2}\right]$$

wherein
i=xmod4
j=ymod4

A recursive equation is now to be defined and applied. It will relate to $$\hat{P}\left[\begin{pmatrix}x\\y\end{pmatrix},t\right]\text{ and }P\left[\begin{pmatrix}x\\y\end{pmatrix},t\right],$$

as mentioned above, and will give $$\hat{P}\left[\begin{pmatrix}x\\y\end{pmatrix},t\right].$$

Figure 10A:
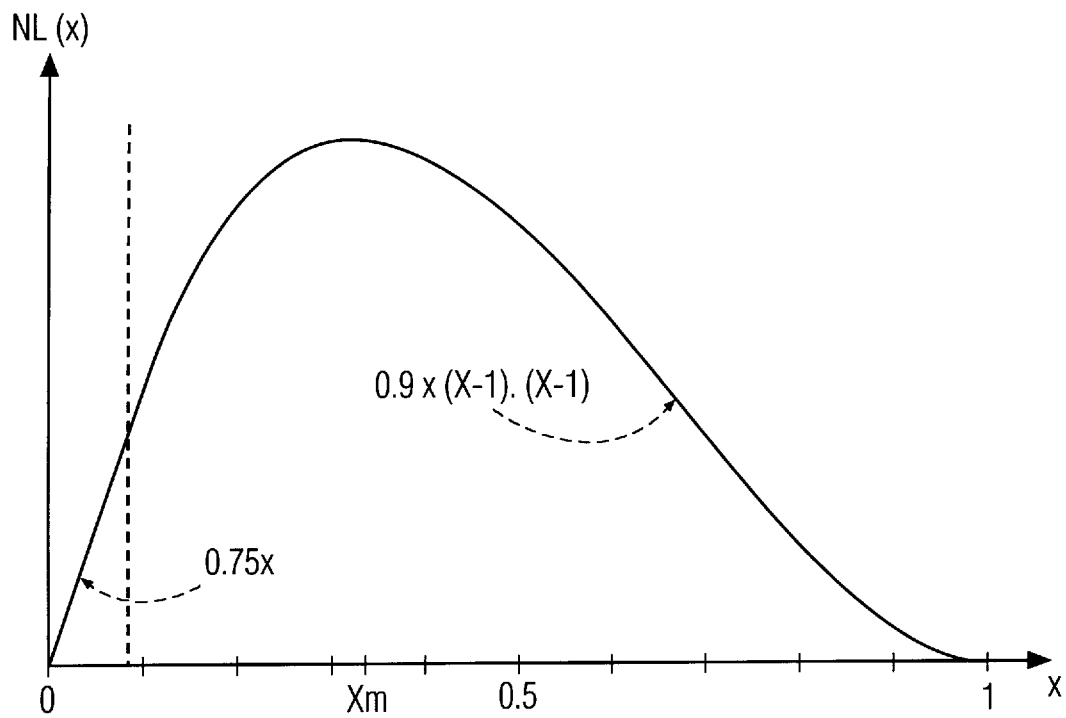
FIG. 10(a) shows a non-linear function employed by the process for reducing recursive temporal noise.
Figure 10B:
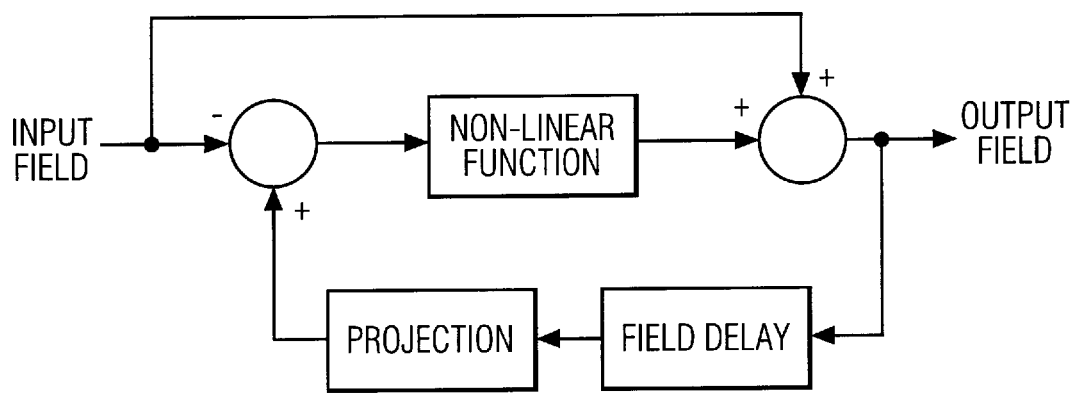
FIG. 10(b) is a block diagram of a filter for reducing recursive temporal noise.

Assuming that the appearance of an object barely changes from one frame to another and in any case slowly relative to the time constant of the filter, the differences in luminosity are due only to noise. In the context of the present example, the recursion equation used is therefore:

$$\hat{P}\left[\begin{pmatrix}x\\y\end{pmatrix},t\right]=P\left[\begin{pmatrix}x\\y\end{pmatrix},t\right]+$$

$$f\left(\hat{P}\left[\begin{pmatrix}x\\y\end{pmatrix},t\right]-P\left[\begin{pmatrix}x\\y\end{pmatrix},t\right]\right)$$

wherein f is a non-linear function adapted to the noise, issuing from the non-linear function NL shown in FIG. 10(a) with the diagram of the recursive filter used (FIG. 10(b)). This function has a linear portion at the beginning of its curve: for slight differences between the received frame and its projection, the correction is maximum and the output pixel is interpolated linearly with a factor ¾ for the projection and ¼ for the received pixel. If the difference increases, the probability of deleting an actual transition in the frame also increases, and the received pixel is protected until the estimate is not considered at all if the deviation is too great.

According to the present embodiment, this function is adapted to the variance in the noise estimated at the moment when the movement vectors are calculated: the difference between the noise to be reduced and the information to be saved can thus be found.

NL is therefore written:

NL:R$^+$→R
x αNL(x)

$$\forall 0 \leq x \leq 1 : NL(x) = \min\left(\frac{3}{4} x, \frac{9}{10} x \cdot (x-1)^2\right)$$

∀x>1:NL(x)=0,
when f is the odd function of R in R defined over R$^+$ by:

$$f(x) = \frac{2s}{x_M} NL\left(\frac{x}{2s} \cdot x_M\right)$$

where s is the typical deviation of the noise measured by the algorithm and $x_M$ the local maximum of the function NL.

We will put:
s=Noiseest

According to a variation of the present example, time noise is not reduced when confidence in a movement vector is too low relative to the noise of the frame.

According to a further variation, spatial filtering of the stored field is carried out before projection along the movement vector field. In fact, in view of the sub-sampling carried out before the estimation of movement, the precision of the movement vectors and consequently of the projection is of two pixels. The finer details are eliminated by means of a linear low-pass filter. Measurement has demonstrated that low-pass filtering reduces the noise level by an additional 2 dB approximately.

Interpolation

After having obtained a vector field which is as exact as possible for each field to be interpolated, the fields to be displayed are to be deduced henceforth from this information and the input fields. The same objectives will not be aimed for, depending on the field taken into consideration.

In particular, the following lines of conduct will be followed:

Attempts will be made to maintain homogeneity in the various interpolation procedures adapted to each field: too great a difference between two types of interpolation leads to differences in appearance of one field on the other which, repeated 75 times per second, create flickering which is more annoying than that which is to be reduced;

Steps are taken to prevent an error on a movement vector, even if great in value but sufficiently localised, or a difference between the actual vector field and that measured due, for example, to digitisation, from creating excessively visible disturbance. Furthermore, the presence of noise in the frame should not jeopardise the interpolation process.

Interpolation of Field 1 (luminance)

The field 1 is a particular case in that its even lines are picked up as they are. However, the odd lines should be reconstituted.

The luminance of a pixel of field 1 will be annotated $P_1(x,y)$ wherein ($0 \leq x \leq 719; 0 \leq y \leq 575$).

According to the present embodiment, several types of interpolation are employed to reconstitute the missing lines:
vertical linear interpolation by averaging (pure spatial filtering)
interlacing of fields 1 and 3 in the immobile zones (pure temporal filtering)
interpolation employing the movement vectors (spatial and temporal filtering).

The choice of the type of interpolation is made main block by main block as a function of criteria linked to the vector and to the error associated with the block.

The vector associated with a main block of field 1 is that associated with the main block in the same position in field 2/3. Although movement is not estimated for the blocks of field 1 but for the blocks of field 2/3, these vectors are still taken into consideration. In fact, if we move away from the edges of the moving objects and if the movement is regular, the vectors obtained by direct estimation on the blocks of field 1 will be similar to the vectors calculated for field 2/3.

Vertical linear interpolation (pure spatial filtering) is a fallback solution employed when confidence in the movement vector detected is too low. The interpolation:

$$P_1[(x,y)] = \frac{1}{2}\left(P\left[\binom{x}{y-1}, 0\right] + P\left[\binom{x}{y+1}, 0\right]\right)$$

is employed for the present embodiment.

Vertical averaging has the drawback of causing very visible "steps" to appear on the diagonal lines. Furthermore, it gives mediocre definition, at most equal to that of a conventional television set. Finally, it necessarily causes line flickering as fields 2 and 3 cannot be interpolated in this way. Attempts will therefore be made to avoid vertical averaging if possible.

This pure spatial filtering is employed within the spatial and temporal filter described hereinafter.

If the movement vector associated with a main block is zero, filtering known as pure temporal filtering is carried out in that the missing lines of field 1 are selected in a different field. The lines of two fields are therefore interlaced. The criterion selected to determine the static character of a main block is comparison of the error in estimation of movement relative to a threshold. If the error is lower than this threshold, the block is considered to be static. In fact, if only a portion of the block is static, the other portion will still create a significant error.

The criterion is written:
MBError(i,j)<threshold×noiseest
and the interpolated pixel will be written,
when y is even:
$P_1(x,y)=P(x,y,0)$
when y is odd:

$$P_1(x,y) = P\left(x, y, \frac{1}{2}\right)$$

This type of interpolation allows a double vertical definition to be permitted and the line flicker to be eliminated, in comparison with vertical type interpolation by average.

If the movement vector is not zero or if the movement vector is zero but the criterion relating to the above-defined associated error is not fulfilled, spatial and temporal filtering is employed for interpolation. This is median type filtering in the context of the present example.

A median type filter allows good definition to be maintained and allows the fronts of the frame to be respected, contrary to purely linear filters.

Figure 11:
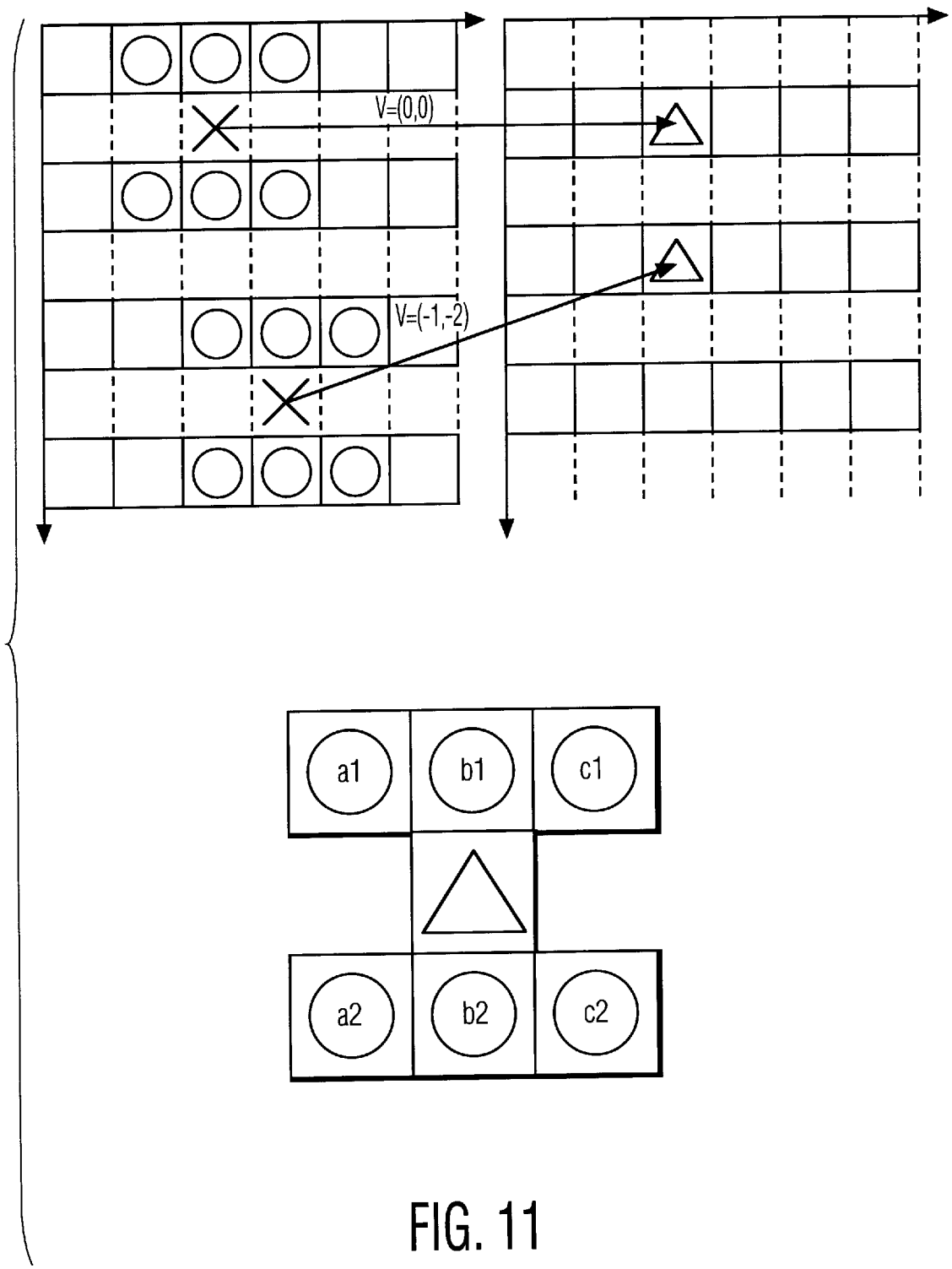
FIG. 11 shows a spatial and temporal filter of the median type used for interpolation of the field 1.

FIG. 11 illustrates this type of interpolation. In this figure, an "X" designates the pixel to be interpolated, a circle designates a pixel of the field 1 and a triangle a pixel of the field 2/3.

The value of an interpolated pixel is determined in two stages:

In a first stage, three values corresponding to three filters F1, F2 and F3 are determined.

F1 produces an average of the values of the pixel (b1) situated above the pixel to be interpolated and of the pixel (b2) situated below the pixel to be interpolated.

F2 gives the median value between b1, b2 and the value of the pixel (b) of field 2/3 corresponding to the translation by the appropriate movement vector of the pixel to be interpolated of field 1.

F3 gives the median value of the value of the pixel (b) and the values of the four pixels (a1, c1, a2, c2) diagonally adjacent to the pixel to be interpolated.

In a second stage, the median value is determined from the three values given by these filters.

Let MB(i,j) be the vector of the main block of which the pixel to be interpolated forms part.

Assuming:
$v_x = (1\ 0) \cdot MB(i,j)$
$v_y = (0\ 1) \cdot MB(i,j)$
when y is even:

$$P_1(x,y) = P\left[\begin{pmatrix} x \\ y \end{pmatrix}, 0\right]$$

when y is odd:

$$F1(x,y) = \frac{1}{2}\left(P\left[\begin{pmatrix} x \\ y-1 \end{pmatrix}, 0\right] + P\left[\begin{pmatrix} x \\ y+1 \end{pmatrix}, 0\right]\right)$$

$$F2(x,y) = med3\left(P\left[\begin{pmatrix} x \\ y-1 \end{pmatrix}, 0\right]; P\left[\begin{pmatrix} x \\ y+1 \end{pmatrix}, 0\right]; P\left[\begin{pmatrix} x+v_x \\ y+v_y \end{pmatrix}, \frac{1}{2}\right]\right)$$

$$F3(x,y) = med5\left(P\left[\begin{pmatrix} x-1 \\ y-1 \end{pmatrix}, 0\right]; P\left[\begin{pmatrix} x-1 \\ y+1 \end{pmatrix}, 0\right]; P\left[\begin{pmatrix} x+1 \\ y-1 \end{pmatrix}, 0\right]; P\left[\begin{pmatrix} x+1 \\ y+1 \end{pmatrix}, 0\right]; P\left[\begin{pmatrix} x+v_x \\ y+v_y \end{pmatrix}, \frac{1}{2}\right]\right)$$

Ultimately:
$P_1(x,y) = med3(F1(x,y); F2(x,y); F3(x,y))$

A filter relating to seven values of pixels is thus constructed, of which a single one does not belong to the current field. The effects due to poor estimation of movement are thus reduced.

On the other hand, definition will be well maintained and the contours of the objects well followed by directional median filtering which acts in vertical and diagonal directions.

Interpolation of Field 2 (luminance)

Field 2 is interpolated from the vector field in the region of the sub-blocks. All the pixels of the field should be interpolated as the field is not combined temporally with an input field, as is the case for field 1.

For the sake of homogeneity, the interpolation mechanisms employed for the field 2 have characteristics similar to those already employed for the field 1.

We therefore proceed sub-block by sub-block.

As with the field 1, if the error associated with the movement vector of a sub-block is great, interpolation is carried out with the spatial and temporal filter already used for the field 1. However, as field 2 is situated temporally between field 1 and field 2/3, the vector of movement between fields 1 and 2/3 is separated into two vectors, one (front vector) indicating movement between field 1 and field 2 and the other indicating movement between field 2 and field 2/3. Each of these two vectors is rounded to an integer value. It will be remembered that identical breakdown of a movement vector into two vectors was employed during calculation of the movement vectors associated with the sub-blocks of the field 2. Rounding will be carried out in the same way in both cases to avoid the addition of errors.

If (i,j) represent coordinates of the sub-block containing the pixel to be interpolated, the vectors:

$$\text{Rear}(i,j) = int\left[\frac{2}{3} \cdot SB_2(i,j)\right]$$

$$\text{Front}(i,j) = SB_2(i,j) - \text{Rear}(i,j)$$

will be calculated.

Three preliminary values (a, b, c) are then determined. Calculation differs depending on whether the pixel to be interpolated is situated in an even or odd line.

When y is even, assuming $$a = P\left[\begin{pmatrix} x \\ y-1 \end{pmatrix} + \text{Front}(i,j), \frac{1}{2}\right]$$

$$b = P\left[\begin{pmatrix} x \\ y \end{pmatrix} - \text{Rear}(i,j), 0\right]$$

$$c = P\left[\begin{pmatrix} x \\ y+1 \end{pmatrix} + \text{Front}(i,j), \frac{1}{2}\right]$$

then:

$$P_2(x,y) = med3\left(\frac{(2*a+b)}{3}; med3(a,b,c); \frac{(2*c+b)}{3}\right)$$

When y is odd, similarly assuming:

$$a = P\left[\begin{pmatrix} x \\ y-1 \end{pmatrix} - \text{Rear}(i,j), 0\right]$$

$$b = P\left[\begin{pmatrix} x \\ y \end{pmatrix} + \text{Front}(i,j), \frac{1}{2}\right]$$

$$c = P\left[\begin{pmatrix} x \\ y+1 \end{pmatrix} - \text{Rear}(i,j), 0\right]$$

then:

$$P_2(x,y) = med3\left(\frac{(a+2*b)}{3}; med3(a,b,c); \frac{(c+2*b)}{3}\right)$$

Figure 13:
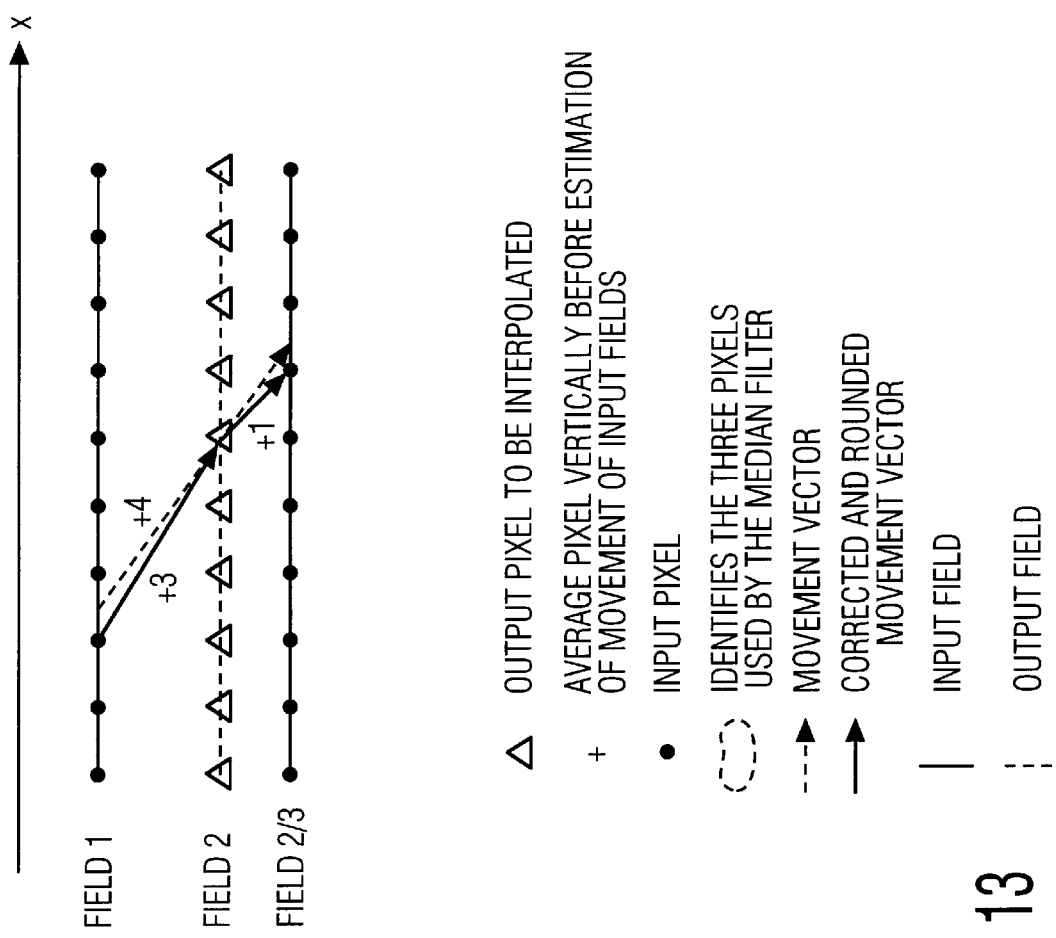
FIG. 13 shows two embodiments of the spatial and temporal filter used for interpolation of the field 2.
Figure 13:
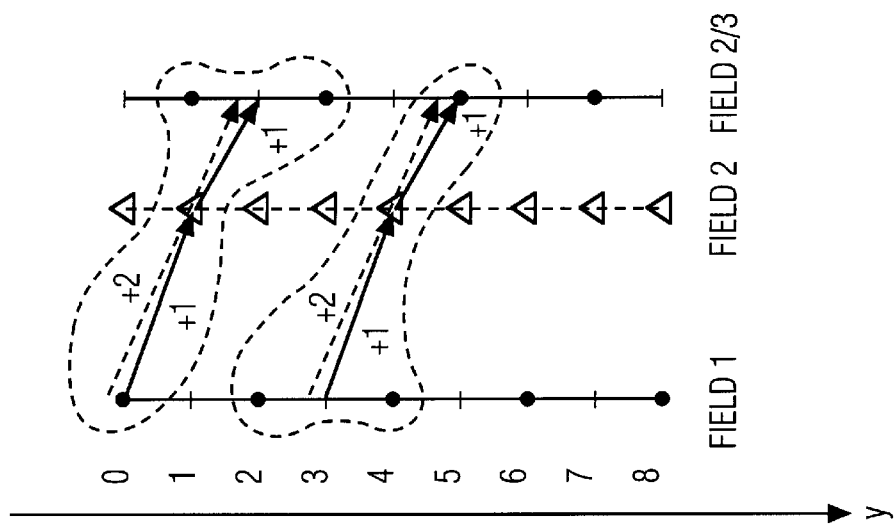

This filtering is illustrated by FIG. 13.

$P_2(x,y)$ is the value of the interpolated pixel and corresponds to the median value of three values: the results of two linear filters and of a median filter from the values of the pixels a, b and c.

The two linear filters effect time interpolation with weighting coefficients corresponding to the relative positions of the pixel to be interpolated relative to the pixels a, b, c. It should be noted that these are two pure time filters, that is employing a single pixel in each of the input fields. This allows a loss of vertical resolution to be avoided.

The median filter also allows the generated field to maintain good spatial resolution. However, it also allows a certain homogeneity between the various interpolation mechanisms of the three fields to be maintained.

If the movement vector associated with a sub-block is zero or if the confidence in a vector is high (low error), interpolation will be of the pure time interpolation type as in the case of field 1: the lines of fields 1 and 2/3 are interlaced:

When y is even:
   $P'_2(x,y)=P(x,y0)$
When y is odd:
   $P'_2(x,y)=P(x,y,1/2)$

A second possible value for this pixel, known as fallback value, is also calculated. This value, annotated $Fallback_2(x,y)$ corresponds to linear filtering which very severely cuts the spatial high frequencies on the two fields concerned:

$$Fallback2(x,y) = \frac{1}{16} (1\ 2\ 3\ 4\ 3\ 2\ 1)$$

$$\frac{1}{3}\begin{bmatrix}P(x-3,y,0)\\P(x-2,y,0)\\P(x-1,y,0)\\P(x,y,0)\\P(x+1,y,0)\\P(x+2,y,0)\\P(x+3,y,0)\end{bmatrix} + \frac{2}{3}\begin{bmatrix}P\left(x-3,y,\frac{1}{2}\right)\\P\left(x-2,y,\frac{1}{2}\right)\\P\left(x-1,y,\frac{1}{2}\right)\\P\left(x,y,\frac{1}{2}\right)\\P\left(x+1,y,\frac{1}{2}\right)\\P\left(x+2,y,\frac{1}{2}\right)\\P\left(x+3,y,\frac{1}{2}\right)\end{bmatrix}$$

The confidence attributed to a movement vector is also defined as:

$$Conf(x,y) = \frac{Error_2(x,y)}{NBPixel}$$

wherein NBPixel represents the number of pixels contained in a sub-sampled sub-block. Conf(x,y) represents the error brought to a pixel.

The value $P_2(x,y)$ of the interpolated pixel will therefore be:

$P_2(x,y) =$ $$med3\left(P'_2(x,y) - \frac{Conf(x,y)}{Scale}, Fallback(x,y), P'_2(x,y) + \frac{Conf(x,y)}{Scale}\right)$$

The value $P_2(x,y)$ is equal to the value of the pixel compensated in movement but inset so as not to be able to remove itself from the value of the fallback pixel by a value greater than confidence divided by a corrective factor.

Interpolation of Field 3 (luminance)

The mechanisms are very similar to those employed for field 2. Field 3 is interpolated from fields 2/3 and 4 (that is field 1 of the following cycle) and from the vectors of the sub-blocks $SB_3(i,j)$. Only the interpolation coefficients and the appearances of line parity will change.

The vectors will therefore be calculated:

$$Front(i,j) = int\left[\frac{2}{3} \cdot SB_3(i,j)\right]$$

$$Rear(i,j) = SB_3(i,j) - Front(i,j)$$

and the points will be calculated:

When y is odd, assuming $$a = P\left[\begin{pmatrix}x\\y-1\end{pmatrix} + Front(i,j), 1\right]$$

$$b = P\left[\begin{pmatrix}x\\y\end{pmatrix} - Rear(i,j), \frac{1}{2}\right]$$

$$c = P\left[\begin{pmatrix}x\\y+1\end{pmatrix} + Front(i,j), 1\right]$$

then:

$$P_3(x,y) = med3\left(\frac{(a+2*b)}{3}; med3(a,b,c); \frac{(c+2*b)}{3}\right)$$

When y is even, similarly assuming:

$$a = P\left[\begin{pmatrix}x\\y-1\end{pmatrix} - Rear(i,j), \frac{1}{2}\right]$$

$$b = P\left[\begin{pmatrix}x\\y\end{pmatrix} + Front(i,j), 1\right]$$

$$c = P\left[\begin{pmatrix}x\\y+1\end{pmatrix} - Rear(i,j), \frac{1}{2}\right]$$

then:

$$P_3(x,y) = med3\left(\frac{(2*a+b)}{3}; med3(a,b,c); \frac{(2*c+b)}{3}\right)$$

Figure 14:
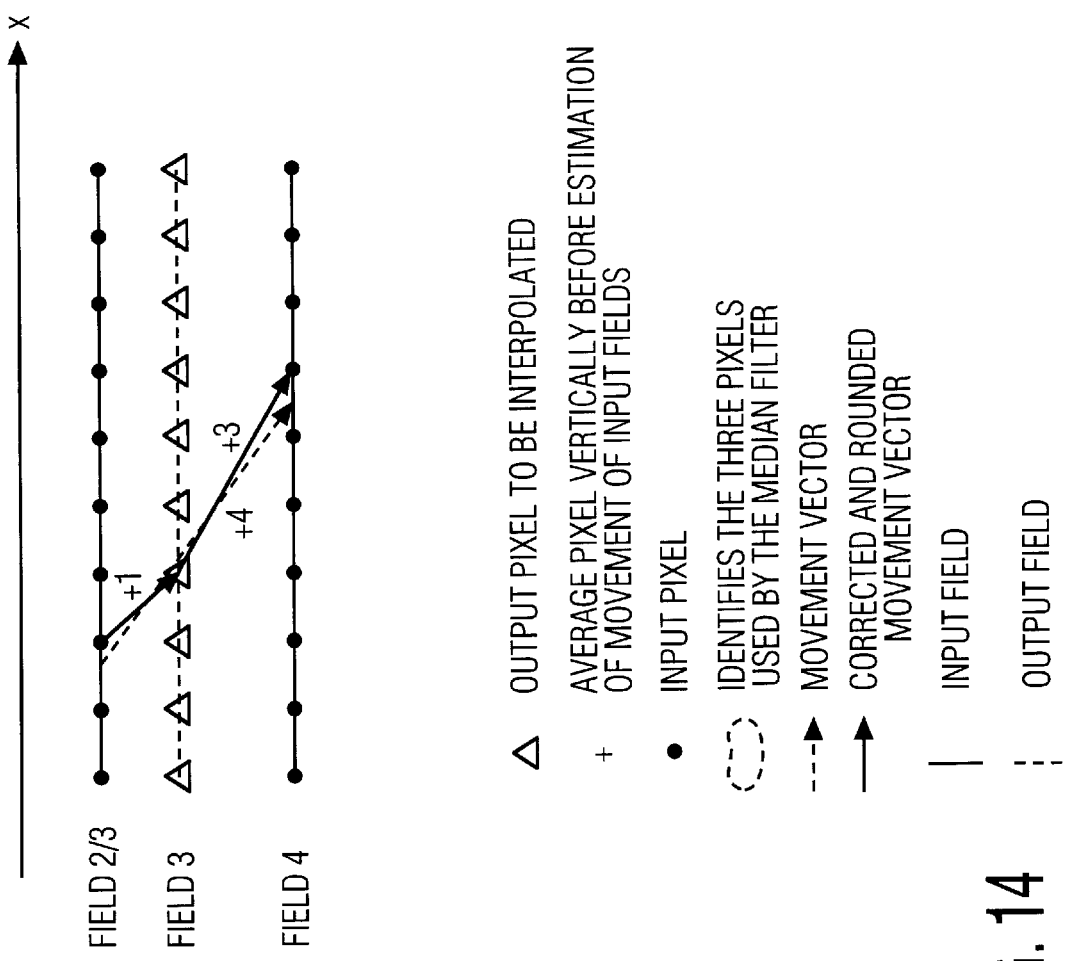
FIG. 14 shows two embodiments of the spatial and temporal filter used for interpolation of the field 3.
Figure 14:
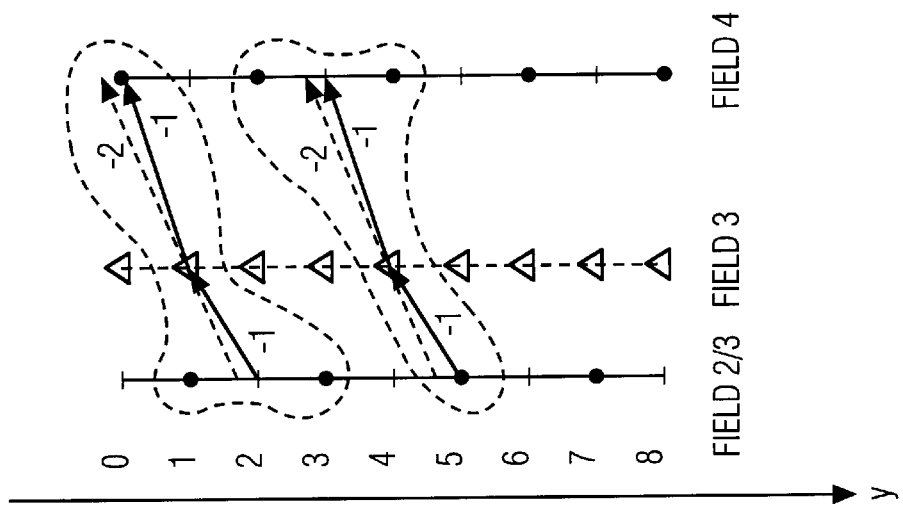

FIG. 14 illustrates this filtering.

If confidence is very high and the vector zero, pure time interpolation will be selected again:

y even:
   $P_3(x,y)=P(x,y,1)$
y odd:
   $P_3(x,y)=P(x,y,1/2)$

The fallback pixel will then be calculated $$Fallback3(x,y) = \frac{1}{16} (1\ 2\ 3\ 4\ 3\ 2\ 1)$$

$$\frac{2}{3}\begin{bmatrix}P\left(x-3,y,\frac{1}{2}\right)\\P\left(x-2,y,\frac{1}{2}\right)\\P\left(x-1,y,\frac{1}{2}\right)\\P\left(x,y,\frac{1}{2}\right)\\P\left(x+1,y,\frac{1}{2}\right)\\P\left(x+2,y,\frac{1}{2}\right)\\P\left(x+3,y,\frac{1}{2}\right)\end{bmatrix} + \frac{1}{3}\begin{bmatrix}P(x-3,y,1)\\P(x-2,y,1)\\P(x-1,y,1)\\P(x,y,1)\\P(x+1,y,1)\\P(x+2,y,0)\\P(x+3,y,1)\end{bmatrix}$$

and confidence in the movement vector, $$Conf(i,j) = \frac{Error_3(i,j)}{NBpixel}$$

Finally, the value of the displayed pixel will be established while preventing this pixel from moving too far from the value of the fallback pixel if confidence is low:

$$P_{3/out}(i,j) =$$

$$med\left(P'_3(i,j) - \frac{Conf(i,j)}{Scale}, Fallback_3(i,j), P'_3(i,j) + \frac{Conf(i,j)}{Scale}\right)$$

It can be seen that the continuity on interpolation is well assured with the previous field since the algorithm is modelled on interpolation of the field 2. However, the vectors of sub-blocks have a time bias—due to the fact that they have been calculated from the main blocks determined for the previous output field—which makes the definition of this field poorer than that of the previous field, particularly in the case of rapidly changing movements.

Processing on Chrominance

Interpolation of chrominance is subject to constraints which are much less severe than that of luminance. In fact, the definition of the eye is much weaker. Furthermore, the standard employed for transmission on the radio-frequency network known as format 4:1:1 includes sub-sampling ending with the transmission of one piece of chrominance information for each four pieces of luminance information, with repetition of the chrominance information identical to itself on two lines. The tolerances in the filters used are thus much greater. Therefore, we will content ourselves with simplified filters.

The chrominance interpolation algorithms are therefore directly extrapolated from the luminance interpolation algorithms, considering the fields containing two times fewer pixels horizontally and therefore dividing the horizontal component of the movement vectors by two.

For field 1, the filter having 7 input pixels used in luminance is limited to 3 input pixels.

Assuming:

$$v_x = \frac{1}{2}(1\ 0) \cdot MB(i,j)$$

$$v_y = (0\ 1) \cdot MB(i,j)$$

When y is even:

$$P_1(x,y) = P\left[\binom{x}{y}, 0\right]$$

When y is odd:

$$F1(x,y) = \frac{1}{2}\left(P\left[\binom{x}{y-1}, 0\right] + P\left[\binom{x}{y+1}, 0\right]\right)$$

$$F2(x,y) = med3$$

$$\left(P\left[\binom{x}{y-1}, 0\right]; P\left[\binom{x}{y+1}, 0\right]; P\left[\binom{x+v_x}{y+v_y}, \frac{1}{2}\right]\right)$$

$$F3(x,y) = P\left[\binom{x+v_x}{y+v_y}, \frac{1}{2}\right]$$

Ultimately:

$P_1(x,y) = med3(F1(x,y); F2(x,y); F3(x,y))$

For fields 2 and 3, the median time filters of luminance are maintained but the fallback filter is eliminated. The horizontal filter is eliminated in the temporal noise reducing filter because it would filter the spatial frequencies too low.

Film Mode

The case of film mode is that of the video sequences generated not in 625/50/2 format but in 625/25/1. These sequences are therefore in a format which is progressive at the input which means that each input frame contains two fields corresponding to the same moment.

This gives rise to the entire problem: in fact, if the above-described algorithm is applied to such sequences without modification, the estimation of movement will be completely inhibited since calculation of the main blocks will take place between the two fields of the same frame and all successive estimations following from them will generate only zero vectors. Therefore, if no movement is detected, no time interpolation or compensation in movement can be made. This is very annoying because each input frame can only be repeated three times on the screen when such sequences are displayed. This results in a jerky effect which is particularly undesirable in any sequence involving movement.

A simple, inexpensive solution allowing this jerky effect to be considerably reduced is as follows: the information-processing phase will be modified so the movement between two different frames is detected and estimated and time interpolation is therefore possible.

Figure 15:
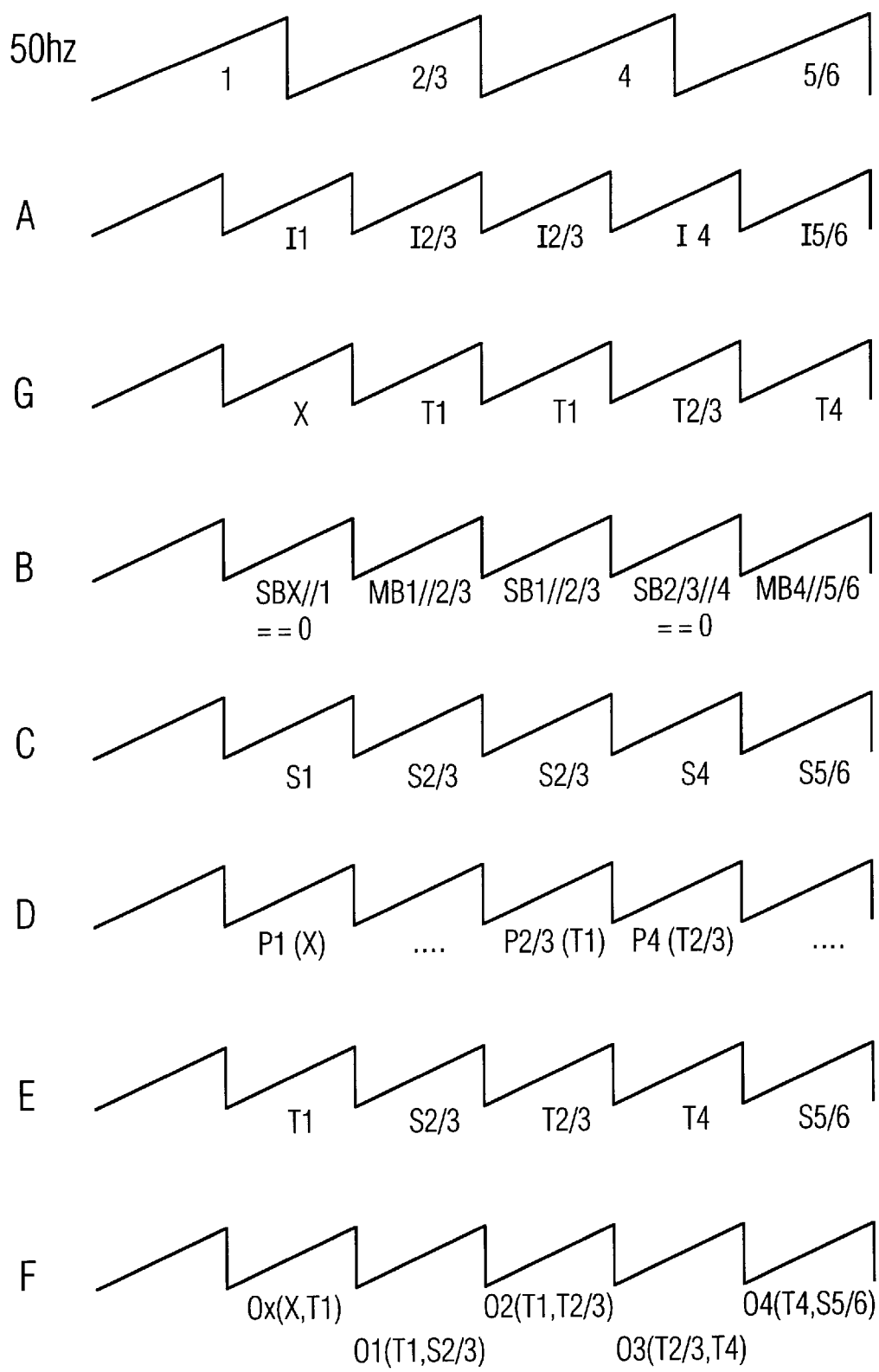
FIG. 15 shows a timing diagram of the fields at certain points of the device shown in FIG. 2 during the film mode.

Consequently, the estimation of main movement (the phase of the main blocks) should take place between an even field 1 and an odd field 2/3 and not between an odd field 1 and an even field 2/3. The timing diagrams in FIG. 15 illustrate this particular mode of operation.

All the processing will therefore be offset by a 50 Hz field. This means that, at the output, the lines to be interpolated will have parity opposed to that which they have during normal processing. However, the filters and the movement estimator will operate strictly identically. The following will be generated successively:

- a progressive field 1 using the vector field of main blocks while maintaining the input lines and interpolating the others with the 7 point spatial and temporal median filter described hereinbefore
- a progressive field 2 using the vector field of sub-blocks estimated with input fields 1 and 2/3. The above-described 3 point median time filter will also be used here. On the other hand, the coefficients 1/2 and 1/2 will be used instead of applying the ordinary weighting coefficients 2/3 and 1/3; this means that the field 2 thus generated is situated equadistantly between the input fields 1 and 2/3. This simple modification of the coefficients itself constitutes a significant reduction in jerks which is readily distinguishable and perceptible on all the frames which have been processed. See the diagram explaining this reduction in jerks in FIG. 16,
- and finally a progressive field 3 normally using the vector field of the sub-blocks corrected by the intermediate blocks. In fact, since the fields 2/3 and 4 issue from the same frame here, there is no movement between these two fields. It is therefore sufficient to force the vector to zero as well as the confidence: in this way, the previously described filter will interlace purely and simply the two input fields to regenerate a perfect progressive frame.

To conclude, film mode can be processed without modification of the filters and mechanisms for estimation of movement: it is sufficient to monitor the phase of processing, the coefficients of interpolation of the field filter 2 and the vectors and confidences of the fields 3 once the presence of the film mode has been detected. The reduction in jerks thus obtained will therefore be inexpensive to implement.

I claim:

1. Process for correcting the estimation of movement in image frames including periodic structures suitable for use in a system for determining movement vectors by comparison of blocks in said image frames, an error matrix being associated with each block, wherein said process comprises the steps of:

(a) identifying adjacent periodic blocks constituting an image element exhibiting a periodic variation in luminance within at least one individual image frame; and (b) determining a single movement vector for all said identified periodic blocks.

2. Process for correcting the estimation of movement in frames comprising periodic structures in a system for determining movement vectors by comparison of blocks of frames, an error matrix being associated with each block, characterized in that it comprises the stages of determination of adjacent periodic blocks and selection of a single movement vector for all these blocks and in that the stage of selection of a movement vector itself comprises the stage of totaling of the error matrices of periodic blocks item by item.

3. Process according to claim 2, characterized in that all adjacent periodic blocks of the same line of blocks are considered.

4. Process according to claim 3, characterized in that the stage of selection of a movement vector also comprises the stage of determining a set of candidate vectors and of selecting as single vector the candidate vector giving the minimum of error in the totalled matrix.

5. Process according to claim 3, characterized in that the stage of selecting a movement vector also comprises the stage of selection as single vector of one of the two vectors of the blocks to the left and to the right of the periodic blocks if the error in the totalled matrix corresponding to one of said two vectors is a local minimum in its line.

6. Process according to claim 5 characterized in that if neither of said two vectors has a corresponding totalled matrix error that is a local minimum in its line, the vector giving the minimum of error of the totalled matrix is selected as single vector.

7. Process according to claim 3 characterized in that the single vector finally retained is the vector of a block immediately above one of the adjacent periodic blocks if it is also periodic and if the error associated with this block in the totalled matrix is a local minimum in its line.

8. Process for detecting periodic structures in a movement estimating system based on blocks of frames comprising the stage of determining an error matrix for various movement vectors for a current block, the stage of determining the line (Row) of the matrix comprising the minimum error (Err_min) of the matrix, of determining the maximum error (Err_max) of said line as well as the stage of determining the smallest secondary minimum (Err_sec_min) of said line, a condition for periodicity of a block being that said two minima are close in value (C1), the estimation of movement of blocks considered periodic being corrected by determining adjacent periodic blocks and selecting a single movement vector for these blocks, said detection process being characterized in that it comprises the stages of determining the greatest secondary maximum (Err_sec_max) of said line, evaluating the noise level of the frame (Errminabs), employing the additional condition (C2) for determining the periodicity of a block: the difference between at least one of the minima (Err_min, Err_sec_min) and the secondary maximum should be significant relative to the noise level of the frame.

9. Process according to claim 8, characterized in that third condition (C3) has to be satisfied: the maximum error (Err-max) should be significant relative to the noise level of the frame (Errminabs).

10. Process according to claim 9 characterized in that the noise level of the frame is equal to the minimum, over all the blocks of a frame, of the minimum errors for each block and of the difference:

Errminabs=min{Errmin(i,j),(Errmax−Errmin)(i,j)} i=1, . . . ,a j=1, . . . ,b wherein Errmin is the minimum error determined for the block (i,j) and wherein Errmax is the maximum error determined for the block (i,j), a and b the number of horizontal and vertical blocks of the frame.

* * * * *